US012207037B2

(12) United States Patent
Chen

(10) Patent No.: US 12,207,037 B2
(45) Date of Patent: Jan. 21, 2025

(54) DYNAMIC LIGHTING FOR AN AUDIO DEVICE

(71) Applicant: Logitech Europe S.A., Lausanne (CH)

(72) Inventor: John Chen, San Ramon, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/082,468

(22) Filed: Dec. 15, 2022

(65) Prior Publication Data

US 2023/0124271 A1 Apr. 20, 2023

Related U.S. Application Data

(62) Division of application No. 17/246,046, filed on Apr. 30, 2021, now Pat. No. 11,570,541.

(51) Int. Cl.
*H04R 1/10* (2006.01)
*F21V 23/04* (2006.01)
(Continued)

(52) U.S. Cl.
CPC ....... *H04R 1/1041* (2013.01); *F21V 23/0407* (2013.01); *F21V 33/0056* (2013.01);
(Continued)

(58) Field of Classification Search
CPC ........... G10L 25/51; H04R 1/028; H04R 1/08; H04R 1/1016; H04R 1/1041; H04R 2420/07; H04R 2460/03; H04R 2460/07
(Continued)

(56) References Cited

U.S. PATENT DOCUMENTS 6,421,426 B1 7/2002 Lucey
7,579,958 B2 * 8/2009 Wallace ............... H04R 29/001 340/815.45

(Continued)

FOREIGN PATENT DOCUMENTS

WO WO 2014/153259 A3 * 9/2014 ............... H04B 7/00

OTHER PUBLICATIONS

U.S. Appl. No. 17/246,046 , "Corrected Notice of Allowability", Dec. 22, 2022, 2 pages.

(Continued)

*Primary Examiner* — Lun-See Lao
(74) *Attorney, Agent, or Firm* — Kilpatrick Townsend & Stockton LLP

(57) ABSTRACT

In some embodiments, a system comprises a host computing device and an audio device communicatively coupled to the host device and including at least one speaker and a plurality of light emitters. The host computing device can include a processor(s) and one or more machine-readable, non-transitory storage mediums with instructions configured to cause the processor(s) of the host computing device to perform operations including receiving user environment data by one or more sensors of the host computing device, receiving user selection data corresponding to a selected mode of operation of the audio device, determining a characterization profile of a surrounding environment of the user based on the user environment data, and sending the characterization profile to the audio device, the characterization profile configured to cause the audio device to control the plurality of light emitters based on the characterization profile and the selected mode of operation.

14 Claims, 9 Drawing Sheets

(51) Int. Cl.

| | |
|---|---|
| ***F21V 33/00*** | (2006.01) |
| ***G10L 25/51*** | (2013.01) |
| ***H04R 1/08*** | (2006.01) |

(52) U.S. Cl.
CPC ................ *G10L 25/51* (2013.01); *H04R 1/08* (2013.01); *H04R 1/1016* (2013.01); *H04R 2420/07* (2013.01); *H04R 2460/03* (2013.01); *H04R 2460/07* (2013.01)

(58) Field of Classification Search
USPC .................................. 381/74, 56–58; 700/94
See application file for complete search history.

(56) References Cited

U.S. PATENT DOCUMENTS

| | | | | |
|---|---|---|---|---|
| 9,591,406 | B1 * | 3/2017 | Huang | H04R 1/2807 |
| 9,939,139 | B2 * | 4/2018 | Kettering | H05B 45/20 |
| 10,251,242 | B1 | 4/2019 | Rosen et al. | |
| 11,570,541 | B2 | 1/2023 | Chen | |
| 2012/0039482 | A1 | 2/2012 | Walsh | |
| 2014/0126755 | A1 | 5/2014 | Strasberg | |
| 2015/0334485 | A1 | 11/2015 | Tyagi et al. | |
| 2016/0165690 | A1 * | 6/2016 | Benattar | H05B 47/155 315/307 |
| 2023/0060349 | A1 * | 3/2023 | Fujiwara | H04R 1/403 |

OTHER PUBLICATIONS

U.S. Appl. No. 17/246,046 , “Notice of Allowance”, Oct. 5, 2022, 13 pages.

* cited by examiner

DYNAMIC LIGHTING FOR AN AUDIO DEVICE

CROSS REFERENCE PARAGRAPH FOR PRIORITY

This application is divisional of U.S. Non-Provisional application Ser. No. 17/246,046, filed on Apr. 30, 2021, and titled "DYNAMIC LIGHTING FOR AN AUDIO DEVICE," which is hereby incorporated by reference in its entirety for all purposes.

BACKGROUND

Headphones typically include a pair of small loudspeaker drivers worn on or around the head and over a user's ears. They include electroacoustic transducers (e.g., speakers) configured to convert an electrical signal to a corresponding sound (e.g., music, voice, sound, etc.). Earbuds may have similar features including a speaker and are typically secured within a user's ear canal. Headphones and earbuds can be referred to generally as "audio devices." Audio devices can be driven by a number of different sources, including mobile computing devices such as smart phones, media player devices, etc., which can referred to more generally as "host computing devices."

Early versions of audio devices were typically hardwired to their corresponding host computing devices. Wireless audio devices brought many new advantages including greater range, no cumbersome wires to untangle, and convenience. However, wireless audio devices often suffer from limited processing bandwidth and battery life. As mobile technologies have continued to mature, wireless audio devices have become increasingly popular and are often used during recreation and in office and social environments. Sometimes, users may operate audio devices at a high enough volume that can obscure or "drown out" ambient sounds including alerts, dangers, or other nearby occurrences that may be important for the user to be aware of. Improvements in audio device technology are needed to help keep users more safe and better engaged with their surrounding environment.

BRIEF SUMMARY

In certain embodiments, a system comprises: a host computing device and an audio device worn on a user's head, the audio device including at least one speaker configured to project audio into the user's ear and a plurality of light emitters, the audio device being wirelessly and communicatively coupled to the host computing device, wherein the host computing device includes one or more processors and one or more machine-readable, non-transitory storage mediums that include instructions configured to cause the one or more processors of the host computing device to perform operations including: receiving user environment data by one or more sensors of the host computing device; determining a characterization profile of a surrounding environment of the user based on the user environment data; receiving user selection data corresponding to a selected mode of operation of the audio device; sending the characterization profile to the audio device causing the audio device to control the plurality of light emitters to operate based on the characterization profile and the user selection data. The host computing device can include at least one of: a microphone, wherein the user environment data that is detected by the at least one microphone and the user environment data includes audio data corresponding to the surrounding environment of the user; a global positioning system (GPS), wherein the user environment data includes GPS data corresponding to a location of the user; or an inertial measurement unit (IMU), wherein the user environment data includes acceleration data corresponding to a motion of the user or orientation data corresponding to an orientation of the user. The one or more machine-readable, non-transitory storage mediums may further include instructions configured to cause the one or more processors of the host computing device to perform operations including: determining a user activity based on the user selection data or the user environment data; and sending the determined user activity to the audio device, wherein the plurality of light emitters operate further based on the determined user activity. In some embodiments, the one or more machine-readable, non-transitory storage mediums can further include instructions configured to cause the one or more processors of the host computing device to perform operations including: determining a power consumption profile based on the characterization profile or the user selection data; and modifying a power consumption of the audio device based on the power consumption profile. The power consumption profile may be further based on at least one of: the determined user activity; a location of the audio device; a time of use of the audio device; or an intended length of use of the audio device. In further embodiments, the one or more machine-readable, non-transitory storage mediums further include instructions configured to cause the one or more processors of the host computing device to perform operations including: determining a lighting profile for the plurality of light emitters based on the characterization profile and the user selection data; and broadcasting the lighting profile causing the audio device and other audio devices with light emitters within a threshold distance to synchronize according to the lighting profile.

In some embodiments, an audio device may comprise: one or more processors; a speaker controlled by the one or more processors, the audio device being configured to be worn by a user such that the speaker projects audio into the user's ear; a plurality of light emitters controlled by the one or more processors; and a communication module configured to wirelessly and communicatively couple the audio device to a remote host computing device, wherein the one or more processors are configured to: receive, from the host computing device via the communication module, a characterization profile corresponding to a surrounding environment of the user, the characterization profile based on user environment data collected by the host computing device or the audio device; and adapt a lighting profile of the plurality of light emitters based on the characterization profile. The one or more processors may be further configured to: receive user selection data corresponding to a selected mode of operation of the audio device, wherein the lighting profile further adapts the plurality of light emitters based on the user selection data. The one or more processors may be further configured to determine a user activity based on the user selection data or the user environment data, wherein the lighting profile further adapts the plurality of light emitters based on the user selection data. In some embodiments, the one or more processors can be further configured to: cause the communication module to facilitate a broadcasting of the lighting profile that causes the audio device and other audio devices with light emitters within a threshold distance of the host computing device or the audio device to synchronize according to the lighting profile. The lighting profile may be configured to cause\ the plurality of light emitters to change at least one of: a light intensity, a blink rate, a blink duration, a color, a blink pattern per light emitter, or a blink sequence across the plurality of light emitters. In certain embodiments, the one or more processors are further configured to: determine a power consumption profile based on the characterization profile or the user selection data; and modify a power consumption of the audio device based on the power consumption profile. In some aspects, the power consumption profile can be further based on at least one of: a determined user activity, a location of the audio device, a time of use of the audio device, or an intended length of use of the audio device. The user environment data may include at least one of: GPS data corresponding to a location and/or a direction of travel of the user; acceleration data corresponding to a motion of the user; or orientation data corresponding to an orientation of the user.

In further embodiments, a method of operating an audio device comprises: receiving, by one or more processors on the audio device, a characterization profile corresponding to a surrounding environment of a user, the characterization profile received from a host computing device wirelessly and communicatively coupled to the audio device; receiving, by the one or more processors, user selection data corresponding to a user-selected mode of operation of the audio device, wherein the audio device is configured to be worn by a user such that a speaker of the audio device projects audio into the user's ear; determining, by the one or more processors, a lighting profile for a plurality of light emitters on the audio device based on the characterization profile and the user selection data; and applying the lighting profile to the plurality of light emitters on the audio device, wherein the audio device is one of a wireless audio headset or a set of wireless audio earbuds. The characterization profile can be based on at least one of: GPS data corresponding to a location and/or a direction of travel of the user; acceleration data corresponding to a motion of the user; or orientation data corresponding to an orientation of the user. The one or more processors can be further configured to cause a communication module to facilitate a broadcasting of the lighting profile that causes the audio device and other audio devices with light emitters within a threshold distance of the host computing device or the audio device to synchronize according to the lighting profile. The lighting profile may cause the plurality of light emitters to change at least one of a light intensity, a blink rate, a blink duration, a color, a blink pattern per light emitter, or a blink sequence across the plurality of light emitters. The one or more processors can be further configured to determine a power consumption profile based on the characterization profile or the user selection data and modify a power consumption of the audio device based on the power consumption profile. The power consumption profile can be further based on at least one of the determined user activity, a location of the audio device, a time of use of the audio device, or an intended length of use of the audio device.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1A:
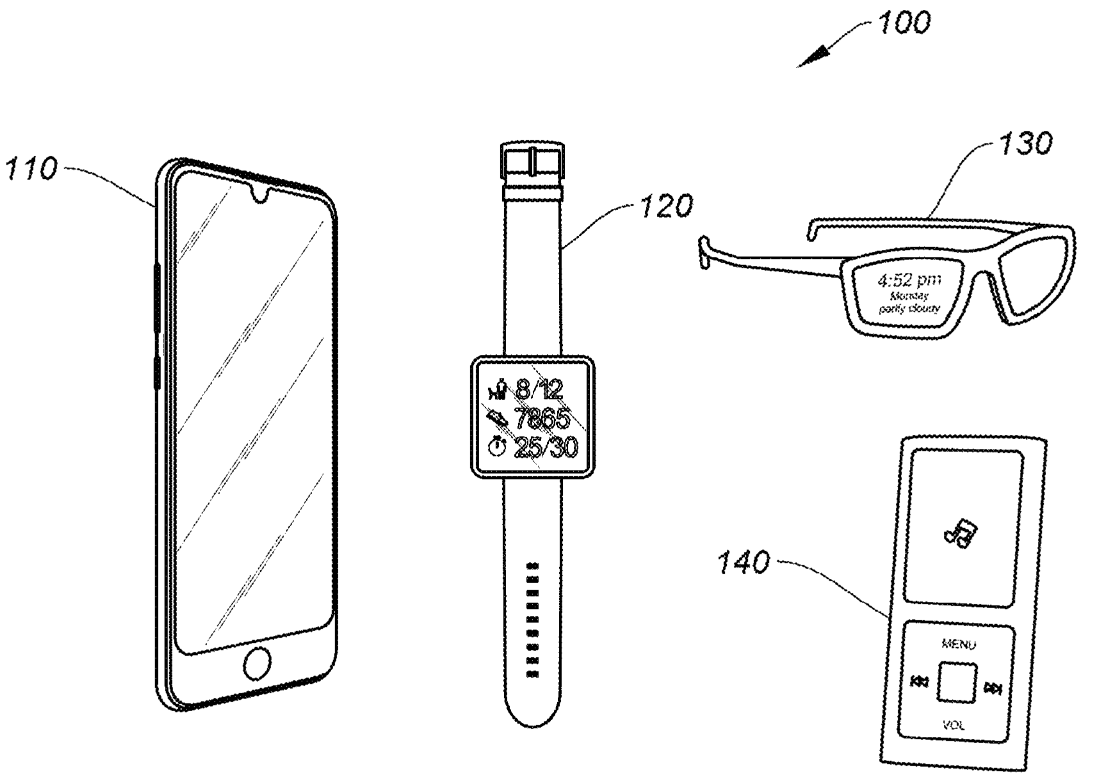
FIG. 1A shows various examples of host computing devices, according to certain embodiments.

Aspects of the present disclosure relate generally to audio, and more particularly to the dynamic adjustment of functional characteristics on an audio device, according to certain embodiments.

In the following description, various examples of the dynamic adjustment of light emitters on an audio device are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Many of the embodiments relate to novel audio devices that can be configured to dynamically adjust certain lighting characteristics (e.g., blink patterns, duration, intensity, etc.) in response to a user's environment. Headphones, earbuds, or other device with an electroacoustic transducer ("speaker") configured to project audio into a user's ear can be referred to generally as "audio devices" throughout this disclosure. Audio devices can be driven by a number of different suitable sources (e.g., typically mobile devices) including smart phones, media players, smart wearables (e.g., smart watch, smart glasses, etc.) or other type of mobile computing device, that may be referred to generally as "host computing devices" or "host devices" throughout this disclosure.

In certain embodiments, audio devices may include one or more lighting elements (e.g., light emitting diodes, or "LEDs") disposed thereon to perform additional functionality. For instance, the lighting elements may be used to illuminate an area around a user during low visibility conditions (e.g., lighting in front of, behind, or sideways from the user), or could be used to alert others (e.g., a driver in a vehicle) to the presence of the user (e.g., running on the side of the road) by using particular lighting patterns, colors, lighting directions, or the like. The left and right side of the audio device may have synchronized or unsynchronized lighting profiles. For instance, a user running on the side of a road might have brighter lights on the street side than the other side, which may still alert drivers of oncoming vehicles to the user's location and may reduce overall power consumption. Multiple users (e.g., bicyclists) may have synchronized audio devices with coordinated lighting patterns (e.g., similar colors, blink patterns, etc.) so that the lighting elements in each of the audio devices in the group operate uniformly, as further described below. The audio device may have spatial awareness based on sensor data collected by the host computing device or the audio device. For instance, a global position satellite (GPS) system and/or an inertial measurement unit(s) (IMU) may be used to determine a location, movement direction, and orientation of the user, which can be used to generate a lighting profile for the plurality of lighting elements. In some aspects, the spatial awareness be used to employ certain power saving features. For instance, the host computing device may be aware of the user's activity (e.g., running at night) and may modify the power profile of the audio device to increase an amount of time that the light emitters can stay illuminated by decreasing power consumption in other areas (e.g., reducing audio volume, decreasing a light intensity of an ear bud on a lower priority side, shut down certain functions such as IMU operations or shut off some, but not all of the plurality of light emitters). In some aspects, the plurality of light emitters may be used to convey distress by blinking in Morse code (e.g., using an "SOS" pattern), changing a color from green to red for runners or cyclists with out-of-threshold vital signs (e.g., detected via a heart rate monitor, or via IMU with irregular gate patterns).

As described above, the automatic configuring of the lighting elements of an audio device are made possible due, at least in part, on sensory capabilities of the host computing device and in some cases the audio device. In addition to sending audio (e.g., music, news, voice calls, etc.) to the audio device, the host computing device may use one or more sensors to gather user environment data around the user. For instance, ambient audio can be detected with one or more microphones on the host computing device, a location of the user can be detected via a global positioning system (GPS), a movement of a user can be detected via an inertial measurement unit (e.g., based on the user's motion, the host computing device may detect that they are sitting, walking, biking, running, etc.), a location of a user can be detected based on a detected Wi-Fi access point (e.g., based on a name of the access point, e.g., "Kayvon's Café," the host computing device can determine that the user is sitting in a coffee shop in a social setting), or other suitable detection methodology. The host computing device can determine a characterization profile of a surrounding environment of the user based on the environment data (e.g., the user is sitting (IMU) in an internet café (Wi-Fi access point) at a popular downtown location (GPS)). The characterization profile can be sent to the audio device, which can then select an appropriate lighting profile for the audio device based on the characterization profile.

In some embodiments, the concepts described above can be implemented, for instance, by a system comprising a host computing device and an audio device worn on a user's head, the audio device including at least one speaker configured to project audio into the user's ear and a plurality of light emitters. The audio device may be wirelessly and communicatively coupled to the host computing device. The host computing device may include one or more processors and one or more machine-readable, non-transitory storage mediums that include instructions configured to cause the one or more processors of the host computing device to perform operations including receiving user environment data by one or more sensors of the host computing device, determining a characterization profile of a surrounding environment of the user based on the user environment data, receiving user selection data corresponding to a selected mode of operation of the audio device, and sending the characterization profile to the audio device causing the audio device to control the plurality of light emitters to operate based on the characterization profile and the user selection data. In some aspects, a user activity can be determined based on the user selection data and user environment data, which can be used to determine a suitable power consumption profile for the audio device, broadcast a lighting profile to a number of other audio devices within a threshold distance or within a user-credentialed network.

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

FIG. 1A shows various examples of host computing devices 100, according to certain embodiments. Some examples can include a smart phone 110, a smart watch 120, smart glasses 130 (e.g., or an augmented/virtual reality headset or another head mounted device), and a media player 140. A host computing device may be referred to herein as a "host computer," "host device," "host computing device," "computing device," "computer," or the like, and may include a machine readable medium (not shown) configured to store computer code, such as driver software, firmware, and the like, where the computer code may be executable by one or more processors of the host computing device(s) to control aspects of the host computing device and/or one or more audio devices.

The majority of the embodiments described herein generally refer to host computing device 100 as a smart phone, however it should be understood that a host computing device can be any suitable computing device that can send audio data to an audio device and generate a characterization profile based on environment data (generated and/or received by the host computing device) that may be used, for example, to generate or change a lighting profile for a plurality of lighting elements on an audio device communicatively coupled thereto.

Figure 1B:
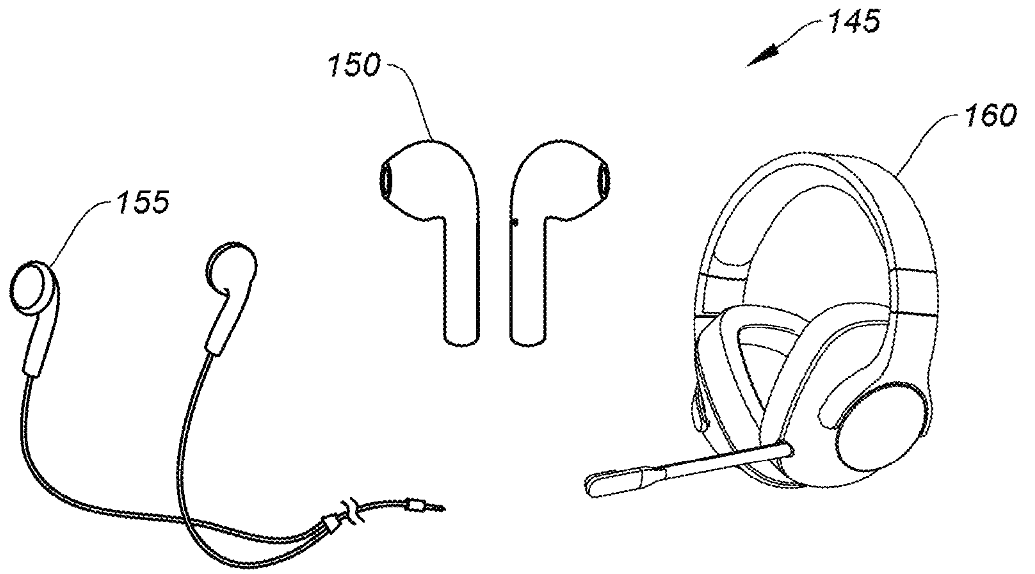
FIG. 1B shows various examples of audio devices, according to certain embodiments.

FIG. 1B shows various examples of audio devices 145, according to certain embodiments. Some audio devices can include wireless earbuds 150, wired earbuds 155, a headset 160, and the like. An audio device does not necessarily have to be a dedicated audio player. For instance, smart glasses 130 (a host computing device) may incorporate one or more electroacoustic transducers to provide audio to a user in addition to video via optical elements (e.g., lenses). The majority of the embodiments described herein generally refer to audio device 145 as wireless earbuds or similar devices, however it should be understood that audio device 145 can be any suitable device with at least one electroacoustic transducer and a plurality of lighting elements, such that the audio device can change a lighting profile of the plurality of lighting elements based on a characterization profile received from a host computing device or generate by the audio device, according to certain embodiments.

A System for Operating an Audio Device

Figure 2A:
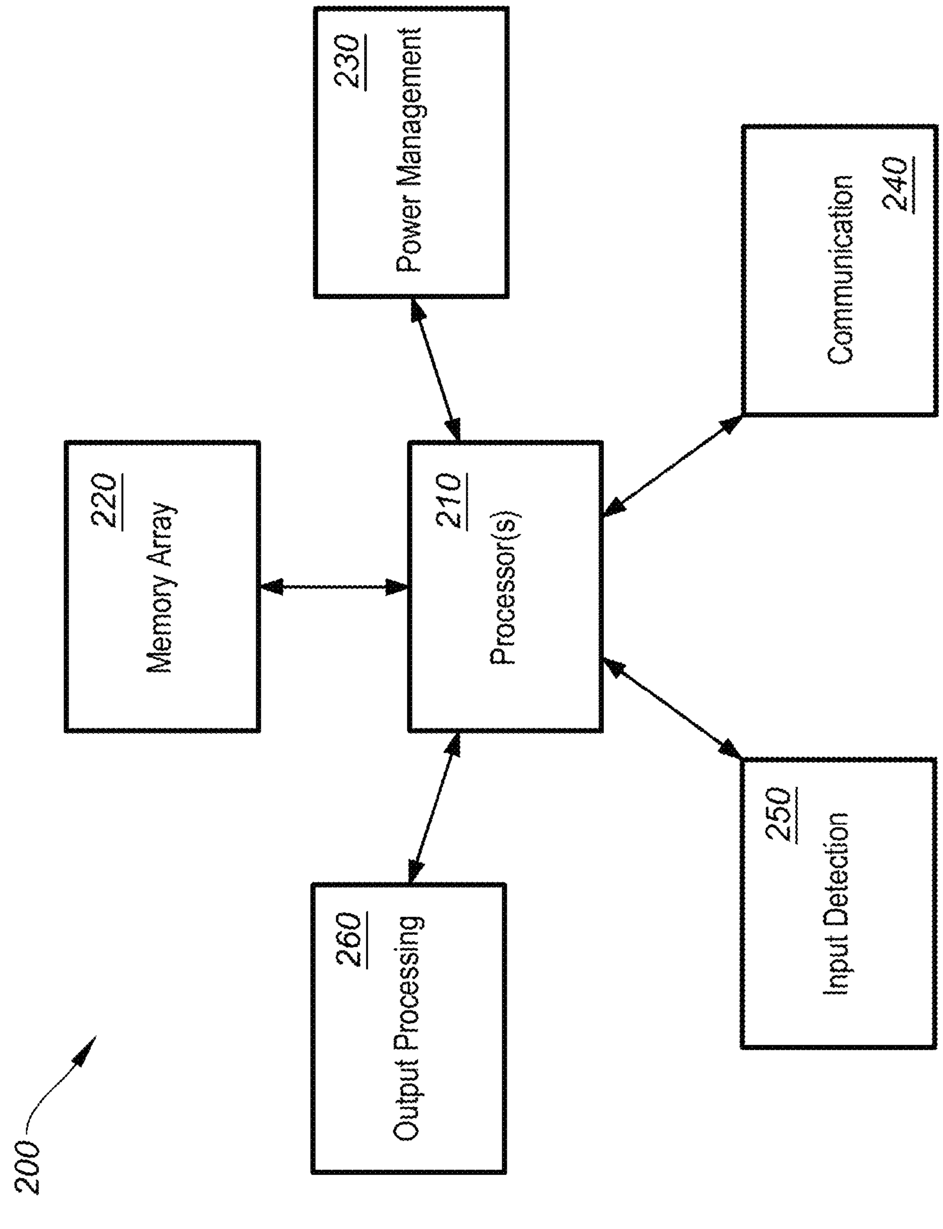
FIG. 2A shows a simplified block diagram of a system configured to operate an audio device, according to certain embodiments.

FIG. 2A shows a simplified block diagram of a system 200 configured to operate an audio device, according to certain embodiments. System 200 may be configured to operate any of the audio devices specifically shown or not shown herein but within the wide purview of possible audio devices encompassed by the present disclosure. System 200 may include processor(s) 210, memory 220, a power management block 230, a communication block 240, an input detection block 250, and an output processing block 260. Each of system blocks 220-260 (also referred to as "modules" or "systems") can be in electronic communication with processor(s) 210 (e.g., via a wired or wireless bus system). System 200 may include additional functional blocks that are not shown or discussed to avoid obfuscation of the novel features described herein. System blocks 220-260 may be implemented as separate modules, or alternatively, more than one system block may be implemented in a single module. For example, input detection block 250 and output processing block 260 may be combined in a single input/output (I/O) block. In the context described herein, system 200 can be incorporated into any audio device described herein and may be configured to perform any of the various methods of generating lighting profiles, as described below at least with respect to FIGS. 4-7, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of audio device 145 (e.g., system block 220-260). Alternatively or additionally, some of system blocks 220-260 may include an additional dedicated processor, which may work in conjunction with processor(s) 210. For instance, MCUs, μCs, DSPs, and the like, may be configured in other system blocks of system 200. Communications block 250 may include a local processor, for instance, to control aspects of communication with host computing device 100 (e.g., via Bluetooth, Bluetooth LE, RF, IR, hardwire, ZigBee, Z-Wave, Logitech Unifying, or other communication protocol). Processor(s) 210 may be local to the audio device (e.g., contained therein), may be external to the audio device (e.g., off-board processing, such as by a corresponding host computing device), or a combination thereof. Processor(s) 210 may perform any of the various functions and methods (e.g., method 800) described and/or covered by this disclosure in conjunction with any other system blocks in system 200. For instance, processor(s) 210 may process data from one or more sensors (e.g., microphone, GPS, IMU, imaging device, touch sensitive surface, buttons, etc.) to detect aspects of a user's environment and/or a user's activity and generate a characterization data therefrom, which can be used to generate and dynamically modify a lighting profile for light emitters on the audio device. In some implementations, processor 302 of FIG. 3 may work in conjunction with processor 210 or processor 272 (of FIG. 2B) to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the audio device, such as an activation of one or more input elements (e.g., buttons, sliders, touch-sensitive regions, etc.), or the like. In some cases, memory block 220 may store software code configured to operate aspects of method 800.

In certain embodiments, memory 220 can store the various data described throughout this disclosure. For example, memory 220 can store data corresponding to the various lighting profiles or characterization profiles described herein. In some aspects, memory 220 can store sensor data generated by the host computing device and/or by the audio device itself, including IMU, GPS, audio data, access point data, and the like.

Power management system 230 can be configured to manage power distribution, recharging, power efficiency, haptic motor power control, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 (or any of blocks 220-260) may be subsumed by another block (e.g., processor(s) 210)

or in combination therewith. The power source can be a replaceable battery, a rechargeable energy storage device (e.g., super capacitor, Lithium Polymer Battery, NiMH, NiCd), or a corded power supply. The recharging system can be configured to charge the power source via corded, wireless, or other power transfer methodology, as would be appreciated by one of ordinary skill in the art with the benefit of this disclosure. In some aspects, power management system 230, processor(s) 210, or a combination thereof, may control some or all of the power consumption mitigation concepts for modifying a lighting profile presented herein.

Communication system 240 can be configured to enable wireless communication with a corresponding host computing device (e.g., 110), or other devices, according to certain embodiments. Communication system 240 can be configured to provide radio-frequency (RF), Bluetooth®, Logitech proprietary communication protocol (e.g., Unifying), infrared (IR), ZigBee®, Z-Wave, Wi-Fi, or other suitable communication technology to communicate with other electronic devices. System 200 may optionally comprise a hardwired connection to the corresponding host computing device. For example, audio device 145 can be configured to receive a USB-type or other universal-type cable to enable bi-directional electronic communication with the corresponding host computing device or other electronic devices. Some embodiments may utilize different types of cables or connection protocol standards to establish hardwired communication with other entities. In some aspects, communication ports (e.g., USB), power ports, etc., may be considered as part of other blocks described herein (e.g., input detection module 150, output processing module 260, etc.). In certain embodiments, communication system 240 may be configured to receive audio data, video data, composite audio/video data, characterization profile data, environment data, or any type of data from host computing device 100. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements on audio device 145. For instance, input detection module 250 can detect user inputs from motion sensors, keys, buttons, dials, touch pads (e.g., one and/or two-dimensional touch sensitive touch pads), click wheels, keypads, microphones, GUIs, touch-sensitive GUIs, image sensor based detection such as gesture detection (e.g., via HMD), audio based detection such as voice input (e.g., via microphone), or the like, as would be appreciated by one of ordinary skill in the art with the benefit of this disclosure. Alternatively, the functions of input detection module 250 can be subsumed by processor 210, or in combination therewith.

In some embodiments, input detection module 250 can detect a touch or touch gesture on one or more touch sensitive surfaces on audio device 145. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of audio device 145 may or may not utilize touch detection or touch sensing capabilities.

Input detection block 250 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), or the like.

Although many of the embodiments described herein include sensors on the audio device and/or host computing device that detect environment data, some embodiments may employ various sensors and similar capabilities on audio device 145. Accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers (e.g., in a "3D air mouse)" In some embodiments, gyroscope(s) and/or magnetometer(s) can be used in lieu of or in conjunction with accelerometer(s) to determine movement or input device orientation.

In some embodiments, output control module 260 can control various outputs for audio device 145. For instance, output control module 260 may control a number of visual output elements (e.g., mouse cursor, LEDs, LCDs), displays, audio outputs (e.g., speakers), haptic output systems, or the like. For instance, output control module 260 may dynamically change a lighting profile of the plurality of lighting elements on the audio device. In some aspects, output control module 260 may work in conjunction with or be subsumed by processor(s) 210. One of ordinary skill in the art with the benefit of this disclosure would appreciate the many modifications, variations, and alternative embodiments thereof.

In certain embodiments, system 200 may incorporate some or all of the system blocks of a host computing device (e.g., system 300). For instance, various embodiments described herein describe host computing devices that utilize one or more sensors to detect environment data via microphones, GPS, IMU, Wi-Fi access points, etc., to determine a characterization profile that is sent to the audio device to be used to configure a lighting profile for a plurality of lighting elements coupled thereto, as further described below. In some aspects, the various sensors described above may be incorporated into audio device 145 such that the various operations performed either by the host computing device (e.g., method 600) and the audio device (e.g., method 700), as described in the embodiments that follow, can all be performed locally on the audio device.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., audio devices) implemented using any combination of circuitry and software. Furthermore, aspects and/or portions of system 200 may be combined with or operated by other sub-systems as required by design. For example, input detection block 250 and/or memory 220 may operate within processor(s) 210 instead of functioning as a separate entity. In addition, the inventive concepts described herein can also be applied to any audio device. Furthermore, system 200 can be applied to any of the audio devices described in the embodiments herein, whether explicitly, referentially, or tacitly described (e.g., would have been known to be applicable to a particular audio-capable device by one of ordinary skill in the art). The foregoing embodiments are not intended to be limiting and those of ordinary skill in the art with the benefit of this disclosure would appreciate the myriad applications and possibilities.

Although certain systems may not expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., lighting profile adjustment, etc.) as described herein.

It should be appreciated that system 200 is meant to be illustrative and that many variations and modifications are possible, as would be appreciated by one of ordinary skill in the art. System 200 can include other functions or capabilities that are not specifically described here (e.g., telephony, IMU, GPS, video capabilities, various connection ports for connecting external devices or accessories, etc.). While system 200 is described with reference to particular blocks (e.g., input detection block 250), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 200 may be combined with or operated by other sub-systems as informed by design.

Figure 2B:
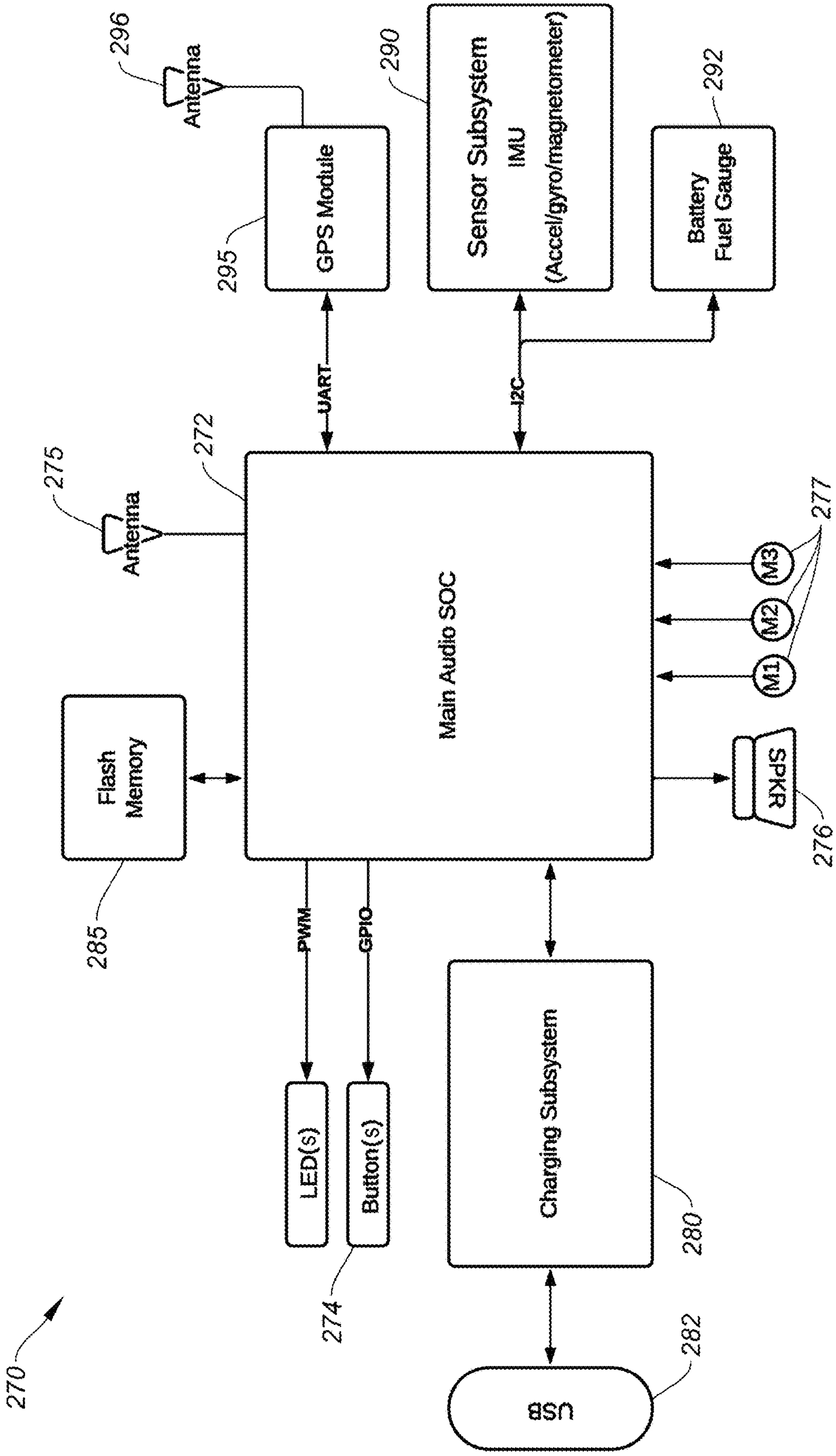
FIG. 2B shows another simplified block diagram of a system configured to operate an audio device, according to certain embodiments.

FIG. 2B shows another simplified block diagram of a system 270 configured to operate an audio device, according to certain embodiments. System 270 may be configured to operate any of the audio devices specifically shown or not shown herein but within the wide purview of possible audio devices encompassed by the present disclosure. System 270 may include processor 272, memory 285, antenna 275, speaker 276, microphones 277, GPS module 295 and GPS antenna 296, sensor subsystem 290, battery 292, button(s) 274, LED(s) 275, charging subsystem 280 and corresponding I/O port 282. In some aspects, system 270 may include the same system blocks as system 200, but with some functionality shown as separate blocks. For instance, speaker 276, microphones 277, sensor subsystem 290, button(s) 274 and LED(s) 275 may be subsumed in whole or in part by input detection block 250, output processing block 260, or a combination thereof. In some cases, GPS 295, GPS antenna 296, and antenna 275 may be subsumed at least in part by communication block 240. FIGS. 2A and 2B are intended to provide examples of how certain functional aspects described herein (e.g., as shown and described below with respect to FIGS. 4A-7) may be implemented at the functional block level. Many of the novel concepts presented herein involve various lighting profiles and corresponding functionality for an audio device. Aspects of FIG. 2A and FIG. 2B may be used to facilitate these functional aspects, and one of ordinary skill in the art with the benefit of this disclosure would appreciate the many modifications, variations, and alternative embodiments thereof.

System for Operating a Host Computing Device

Figure 3:
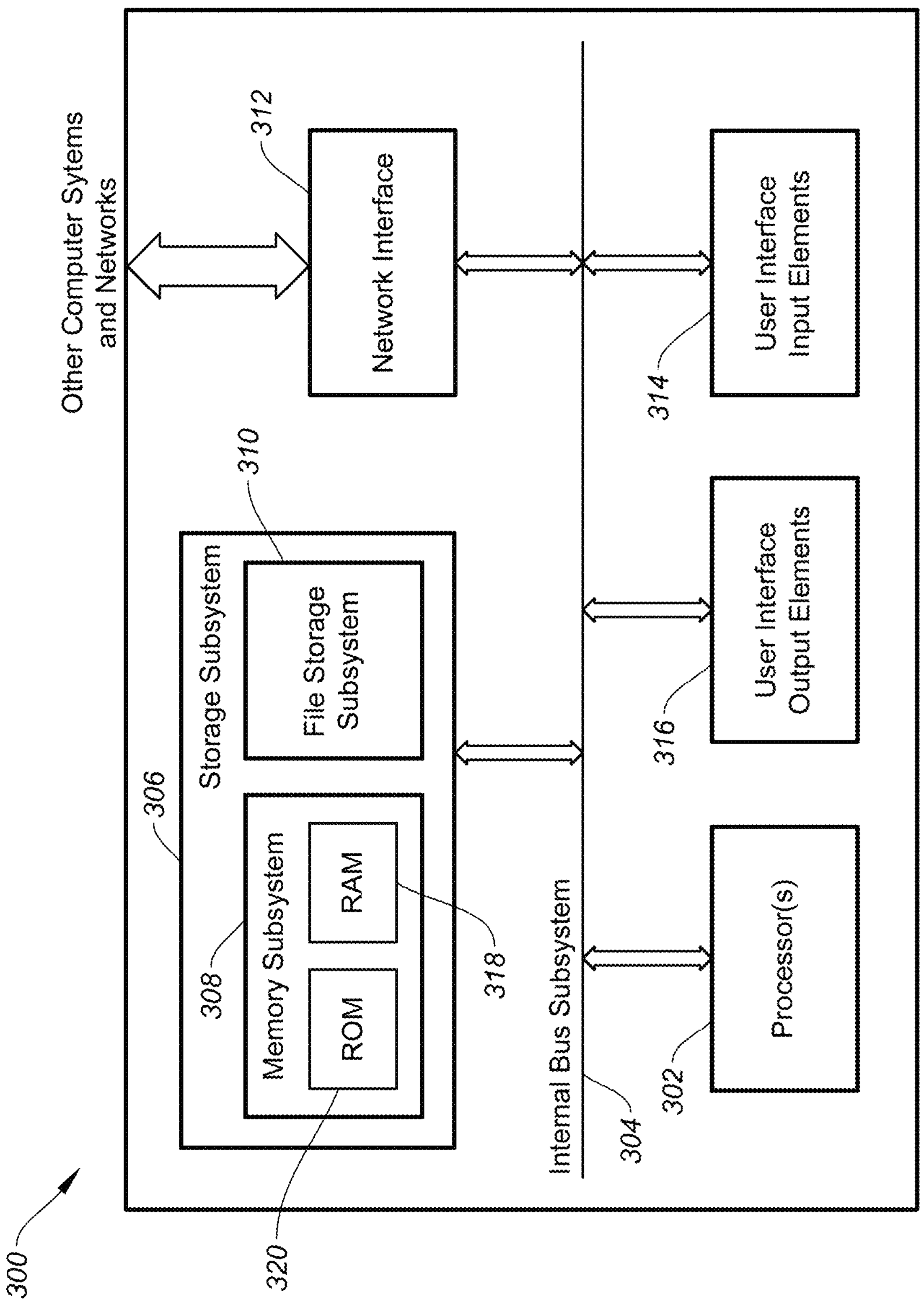
FIG. 3 shows a simplified block diagram of a system configured to operate a host computing device 100, according to certain embodiments.

FIG. 3 shows a simplified block diagram of a system 300 configured to operate a host computing device 100, according to certain embodiments. System 300 can implement some or all functions, behaviors, and/or capabilities described above that would use electronic storage or processing, as well as other functions, behaviors, or capabilities not expressly described. System 300 includes a processing subsystem (processor(s)) 302), a storage subsystem 306, user interfaces 314, 316, and a communication interface 312. System 300 can also include other components (not explicitly shown) such as a battery, power controllers, and other components operable to provide various enhanced capabilities. In various embodiments, System 300 can be implemented in a host computing device, such as a smart phone, wearable smart device, media device, head-mounted device, or the like.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods (e.g., method 700), portions thereof, etc., as described throughout this disclosure. In some cases, processing (e.g., analyzing data, operating system blocks, controlling input/output elements, etc., can be controlled by processor(s) 302 alone or in conjunction with other processors (e.g., processor 210, cloud-based processors, etc.), as would be appreciated by one of ordinary skill in the art with the benefit of this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps (e.g., methods, 700, 800) described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., detecting environment data, determining a characterization profile of the environment data, dynamically adapting a lighting profile of a plurality of light emitters based on the characterization profile, etc.) may be performed by software stored in storage subsystem 306, stored in memory 220 of audio device 145, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication ("network") interface 312.

System 300 may include user interface input devices 314 elements (e.g., touch pad, touch screen, scroll wheel, click wheel, dial, button, switch, keypad, microphones, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.).

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 306. Through programming, processing subsystem 302 can provide various functionality for computing device 300. Processing subsystem 302 can also execute other programs to control other functions of computing device 300, including programs that may be stored in storage subsystem 306. In some aspects, processing subsystem 302 can perform analyzing environmental data (e.g., from microphones, GPS, IMU, etc.), generating characterization profiles of the user's environment based on the environmental data, determining a suitable lighting profile on the audio device (this is typically done on the audio device, but the host computing device may perform this function as well), and the like.

Communication interface (also referred to as network interface) 312 can provide voice and/or data communication capability for system device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently. Communication interface 312 may be configured to access Wi-Fi access points and corresponding data (e.g., access point names, location information, etc.). Communication interface 312 may be configured to enable mono-directional or bidirectional communication between host computing device 100 and audio device 145. For instance, communication interface 312 can be used to send environmental data, characterization profile data, audio data, video data, or any suitable data from a mobile phone 110 to wireless earbuds 150.

User interface input elements 314 may include any suitable audio device elements (e.g., microphones, buttons, touch sensitive elements, etc.), as would be appreciated by one of ordinary skill in the art with the benefit of this disclosure. User interface output elements 316 can include display devices (e.g., LCD), audio devices (e.g., speakers), haptic devices, etc. In typical embodiments, three or more microphones are typically used in order to perform audio beamforming to change an audio cardioid pattern. For instance, with earbuds, each earbud typically employs at least one speaker directed to the ear of a user and at least three microphones. The earbuds may operate independently or in conjunction with one another in terms of cardioid pattern selection, audio processing, etc. Note that user interface input and output devices are shown to be a part of system 300 as separate systems, but some embodiments may incorporate them as a single integrated system, or subsumed by other blocks of system 300. One of ordinary skill in the art with the benefit of this disclosure would appreciate the many modifications, variations, and alternative embodiments thereof.

In some aspects, interface input elements 314 and/or output elements 316 can include a number of sensors including a plurality of microphones, GPS infrastructure, an IMU, or the like. In some cases, other capabilities (e.g., lighting control, mixing levels, etc.) that are not expressly described herein can be controlled by input/output elements 314/316.

In certain embodiments, accelerometers (of an IMU) can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers. In some cases, accelerometers can be used to track movement of a user, whether they are walking (e.g., based on their gait), driving in a car, running, stationary, etc., which can be used as environment data to determine a characterization profile, as described below. In some embodiments, gyroscope(s) can be used in lieu of or in conjunction with accelerometer(s) to determine movement or host computing device (or audio device) orientation.

It will be appreciated that system 300 is illustrative and that variations and modifications are possible. A host computing device can have various functionality not specifically described (e.g., voice communication via cellular telephone networks) and can include components appropriate to such functionality. While the system 300 is described with reference to particular blocks, it is to be understood that these blocks are defined for convenience of description and are not intended to imply a particular physical arrangement of component parts. For example, processing subsystem 302, storage subsystem 306, user interface elements 314, 316, and communications interface 312 can be in one device or distributed among multiple devices. Further, the blocks need not correspond to physically distinct components. System blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even audio devices described herein can be implemented using some or all aspects of system 300.

Embodiments of an Audio Device with Light Emitters

Figure 4A:
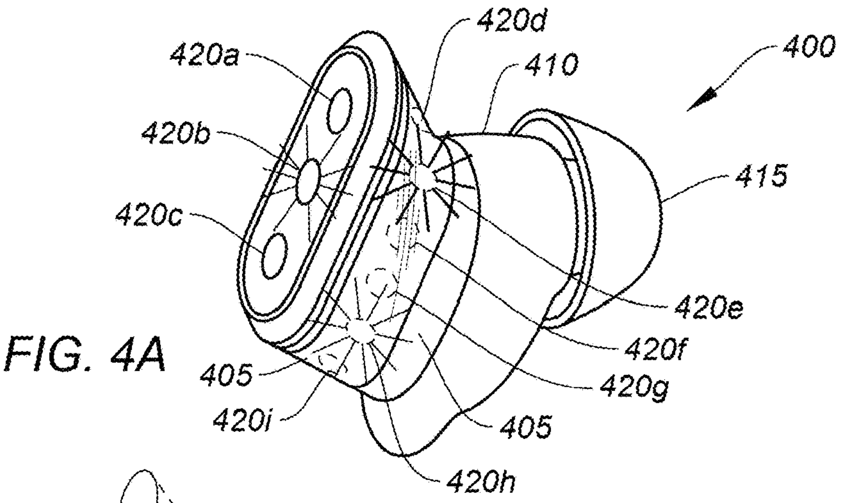
FIG. 4A shows an audio device with a body, a speaker/earbud assembly, a plurality of light, and a light cover, according to certain embodiments.
Figure 4B:
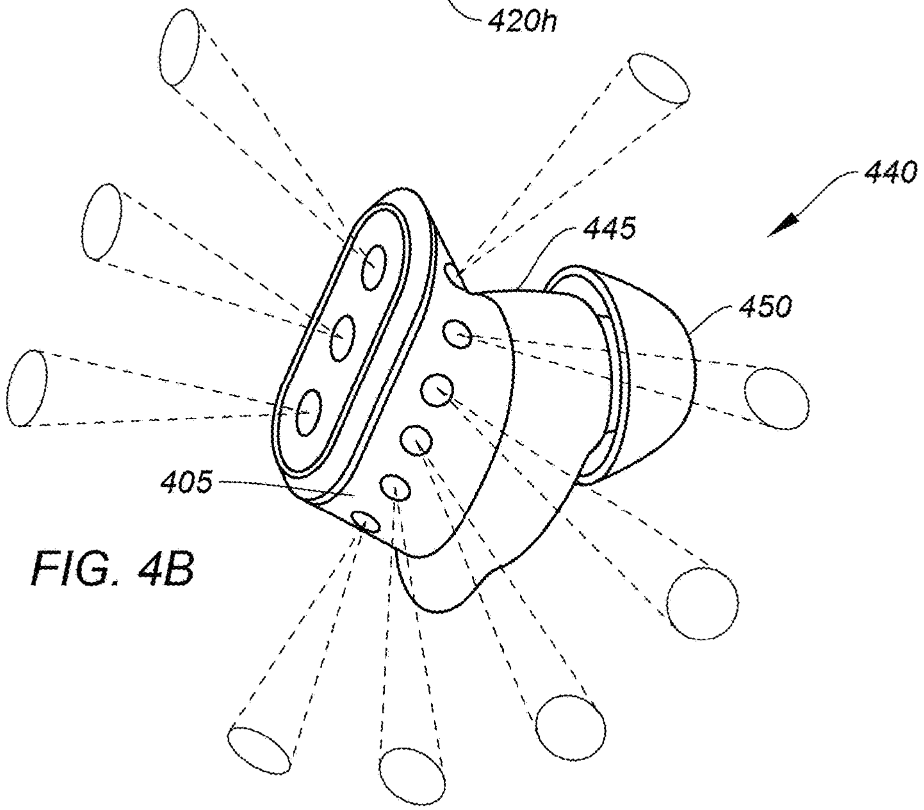
FIG. 4B shows another implementation of an audio device with a body, a speaker/earbud assembly, and a plurality of light emitters, according to certain embodiments.
Figure 4C:
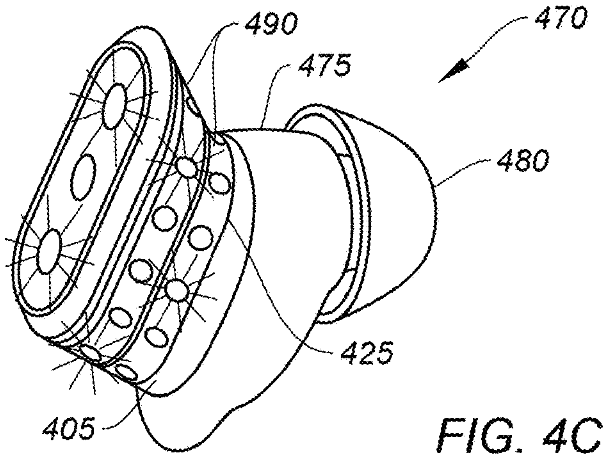
FIG. 4C shows an audio device with a body, a speaker/earbud assembly, and a plurality of light emitters, according to certain embodiments.

FIGS. 4A-4C show various examples of audio devices with different arrays of light emitters that can be configured to operate in the manner described throughout this disclosure. The embodiments of FIGS. 4A-4C may be operated by system 200, 270, or other suitable infrastructure configured to control a lighting profile for a number of on-board light emitting element, as described herein.

FIG. 4A shows an audio device 400 with a body 410, a speaker/earbud assembly 415, a plurality of light emitters (e.g., LEDs, also referred to as light emitting elements) 420*a*-420*i*, and a light cover 405 (also referred to as a light ring) configured to cover LEDs 420*d*-420*i*, according to certain embodiments. Audio device 400 can be worn by a user such that the speaker/earbud assembly 415 fits within and/or is oriented to direct sound into the user's ear canal. Audio device 400 can be an ear bud, a may be part of a headset, head-mounted display, or other suitable audio peripheral device, as would be appreciated by one of ordinary skill in the art with the benefit of this disclosure.

Light emitters 420*a*-420*i* may be LEDs or other suitable light emitting device. Any number of light emitters may be used, but typically at least two or more. Light emitters may be configured to direct light in any suitable direction from the audio device and at any suitable dispersion angle. Some typical directions are radially forward toward the front of the user (e.g., light emitters 420*e*-*h*), radially backwards towards the rear of the user (not shown), and sideways (e.g., outwards) and laterally away from the user (e.g., light emitters 420*a*-*c*). The light emitters can be controlled by a lighting profile (e.g., generated by the audio device (processor(s) 210) or by the host computing device) to perform any number of lighting operations (also referred to as lighting characteristics or effects) not limited to dynamic control of blinking patterns, colors, synchronizations (e.g., left/right channel synchronization, audio devices between users), fading or panning effects (e.g., changing an lighting intensity between left/right channels), modulating effects, alerts (e.g., blinking an SOS pattern or "red alert"), etc. For instance, FIG. 4A shows only some of the light emitters 420 being activated and at different intensities. One of ordinary skill in the art with the benefit of this disclosure would appreciate the many modifications, variations, and alternative embodiments thereof.

Referring back to FIG. 4A, the light cover 405 may be translucent or semi-translucent to allow light from its one or more light emitters configured underneath to pass through. The light cover may provide a visual effect of operating as a solid unitary light source that blends and/or attenuates the light from the plurality of light emitters configured below, as would be appreciated by one of ordinary skill in the art with the benefit of this disclosure.

FIG. 4B shows another implementation of an audio device 440 with a body 445, a speaker/earbud assembly 450, and a plurality of light emitters (e.g., LEDs), according to certain embodiments. Audio device 440 may be similar to FIG. 4A, but without light cover 405. Similarly, the light emitters may be configured to direct light in any suitable direction (e.g., radially forward or backwards, laterally outwards, etc.) from the audio device and at any suitable dispersion angle (e.g., 5°/m).

FIG. 4C shows an audio device 470 with a body 475, a speaker/earbud assembly 480, and a plurality of light emitters (e.g., LEDs), according to certain embodiments. The body 475 includes a number of rotatable modules 490, each including a number of light emitters. The rotatable modules 490 may be configured to be manually rotated such that a user, for instance, can orient the light emitters in any desired direction, and each rotatable module may be configured different from adjacent rotatable modules. In some embodiments, a focusing element (not shown) may be configured to focus light from some or all of the light emitters to change a projection angle from narrow (e.g., 1-5 degrees) to wide (e.g., 20-40 degrees), and may be controlled automatically (e.g., via servos controlled by processor(s) 210) or manually by a user. FIGS. 4A-4C present just some embodiments showing how light emitters might be configured on an audio device. One of ordinary skill in the art with the benefit of this disclosure would appreciate the many modifications, variations, and alternative embodiments thereof.

Dynamic Adjustment of an Audio Device Based on Environmental Data

Aspects of the invention are related to the dynamic adjustment of a lighting profile for light emitting elements (e.g., LEDs) on an audio device (e.g., ear buds, headphones) based on an environment of a user and/or based on a user input. For instance, the lighting elements may be used to illuminate an area around a user during low visibility conditions (e.g., lighting in front of, behind, or sideways from the user), or could be used to alert others (e.g., a driver in a vehicle) to the presence of the user (e.g., running on the side of the road) by using particular lighting patterns, colors, lighting directions, or the like. The left and right side of the audio device may have synchronized or unsynchronized lighting profiles. For instance, a user running on the side of a road might have a bright pulsing light pattern on the street side ear bud and a constant, non-pulsing, lower intensity lighting schema, which may still alert drivers of oncoming vehicles to the user's location and may reduce overall power consumption. Multiple users (e.g., bicyclists) may have synchronized audio devices with coordinated lighting patterns (e.g., similar colors, blink patterns, etc.) so that the lighting elements in each of the audio devices in the group operate uniformly, as further described below. The audio device may have spatial awareness based on sensor data collected by the host computing device or the audio device. For instance, a global position satellite (GPS) system and/or an inertial measurement unit(s) (IMU) may be used to determine a location, movement direction, and orientation of the user, which can be used to generate a lighting profile for the plurality of lighting elements. In some aspects, the spatial awareness be used to employ certain power saving features. For instance, the host computing device may be aware of the user's activity (e.g., running at night) and may modify the power profile of the audio device to increase an amount of time that the light emitters can stay illuminated by decreasing power consumption in other areas (e.g., reducing audio volume, decreasing a light intensity of an ear bud on a lower priority side, shut down certain functions such as IMU operations or shut off some, but not all of the plurality of light emitters). In some aspects, the plurality of light emitters may be used to convey distress by blinking in Morse code (e.g., using an "SOS" pattern), changing a color from green to red for runners or cyclists with out-of-threshold vital signs (e.g., detected via a heart rate monitor, or via IMU with irregular gate patterns). These and other examples are further described below.

At a high level of abstraction, dynamic adjustment of a lighting profile for an audio device can be performed in three steps: (1) the host computing device (e.g., smart phone) uses one or more sensors (e.g., in real-time) to acquire environment data corresponding to an environment that the user is in (e.g., ambient sounds detected by one or more microphones on the host computing device; a motion of the user via IMU to determine a user's activity (e.g., sitting, walking, biking etc.); a location of a user via GPS or Wi-Fi access point data) and analyze that data (e.g., using artificial intelligence) to determine a characterization profile that corresponds to the environment data based on the detected aspects of the surrounding environment (e.g., user is in a gym, a café, an office environment, in traffic, outdoors, on a road/street/highway, based on background noise, etc.); (2) the host computing device sends the characterization profile and/or the environment data to the audio device (e.g., wireless ear bud(s)); and (3) based on the characterization profile and/or the environment data, the earbud(s) dynamically make adjustments to lighting profile for a number of lighting elements configured on the audio device. Such adjustments can include different lighting patterns, colors, intensities, left/right synchronized or non-synchronized patterns, synchronization between multiple audio devices, or the like, as would be appreciated by one of ordinary skill in the art with the benefit of this disclosure. In some aspects, the earbuds may make adjustment further based on user inputs on the host computing device or the audio device (e.g., via one or more buttons, a graphical user interface, etc.) that may indicate environment data (e.g., user location) or mode of operation related to a desired activity, such as a biking or a running mode. In some embodiments, some of the environment data may originate from the audio device via one or more microphones, GUI, or other suitable sensor device (e.g., as described in systems 200, 270).

In some manual modes of operation, user may manually select a lighting pattern for the audio device. However, exemplary embodiments can do this automatically and dynamically based on a detected environment of the user. For example, a smart phone (110) can include a host of sophisticated sensory and processing resources that can be leveraged to help determine a type of environment the user is in and, in some cases, how the user is likely interacting with that environment. Smart phone 110 (or any suitable host computing device) may include a GPS, IMU, one or more microphones, biometric readers, weather data access, and wireless communication capabilities, among other sensing capabilities, that can each generate data that can be generally referred to as "user environment data." The host computing device may analyze some or all of the available user environment data to determine a "characterization profile" that, when received by the audio device, can be used to determine how to configure aspects (e.g., lighting profile) of the audio device.

In some aspects, host computing device (e.g., smart phone 110) may run software (e.g., processor(s) 302 executing software stored on storage subsystem 306) that polls the GPS and determines that the user is traveling at a relatively constant 20 mph along a two-lane road in a remote location. Other informational layers may be gleaned from the GPS data including local or regional definitions (e.g., the user is on a designated trail or park, the user is in a sparsely populated rural area, the user is in a densely populated commercial area, the user is in a building, etc.); speed limit designations that can help determine if the user is in a vehicle, on a bicycle, running, etc., based on the user's speed relative to the speed limit; whether the user is moving linearly or more erratically, which may help determine if the user on a road or on a roadside trail; whether the user has a destination programmed on the GPS software, etc., all of which can be used to help determine not only a mode of travel of the user, but also inform how the lighting profile of the audio device can be better adapted to the current environment. Alternatively or additionally, a user may input user selection data into the host computing device or audio device via any suitable user interface (e.g., GUI, buttons, voice activation, etc.) to select a mode of operation. Some examples include one of a number of activity modes including running, cycling, swimming, driving, stationary activities (e.g., office work), low light environments (e.g., attic, crawl space, night time, etc.), or the like. One of ordinary skill in the art with the benefit of this disclosure would appreciate the many modifications, variations, and alternative embodiments thereof.

Figure 5A:
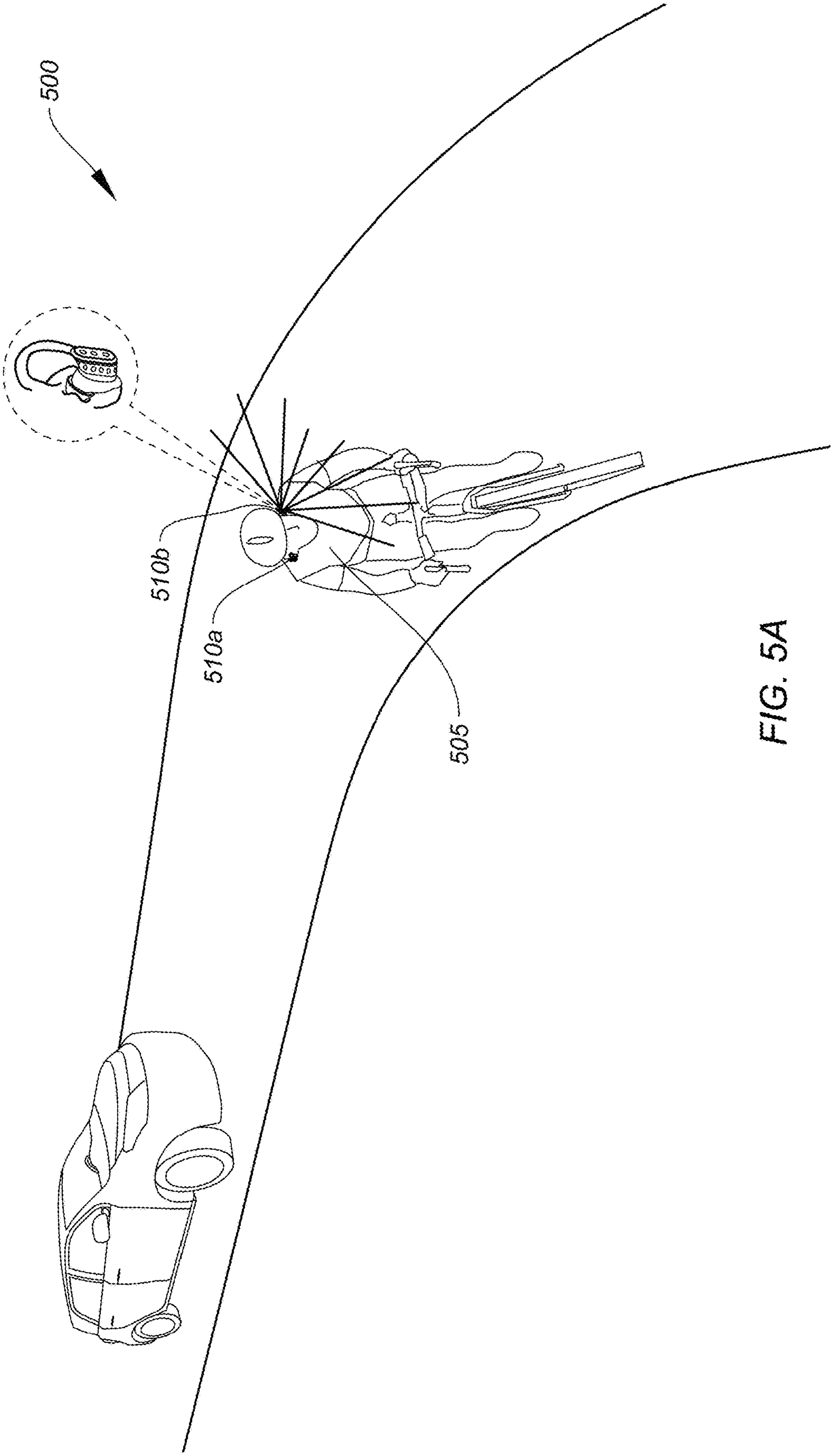
FIG. 5A shows user riding a bicycle in a remote environment along a narrow road and wearing a pair of audio devices, according to certain embodiments.

FIG. 5A shows user 505 riding a bicycle in a remote environment along a narrow road and wearing a pair of audio devices 510*a/b*, according to certain embodiments. One or both of audio devices 510*a/b* may include a processor(s) configured to control the operation of a speaker and a plurality of light emitters to emit light according to a lighting profile. In some embodiments, one of the audio devices (e.g., audio device 510*a*) may include aspects of system 200 or 270 and may control the second audio device (e.g., audio device 510*b*) in a controller-agent relationship.

In certain embodiments, the lighting profile may be based on a characterization profile derived from user environment data (e.g., received from the host computing device and/or the audio device) that corresponds to a surrounding environment of the user. For example, an on-board GPS system on the host computing device (e.g., smart phone) or the audio device(s) 510 that may track the host computing device's location. Using the GPS data, systems 200, 270, or 300, for example, can be configured to derive the user's location, orientation, speed, and direction of travel. Using the IMU, the user's acceleration and speed can be derived, including characteristics of the user's movement, such as the user's gait (based on acceleration measurements). The gait can be used to determine a mode of travel, including whether the user is walking, running, cycling, in a vehicle, etc. In some aspects, one or more microphones on the host computing device or audio device(s) can be used to detect environmental characteristics and ambient sounds including road noise (e.g., traffic), nature sounds (e.g., birds, leaves/branches breaking under foot, crowded areas (e.g., multiple voices detected), or the like. In some aspects, time and/or weather data can be used to determine the time of day and also weather conditions that the user may be exposed to. Thus, any of systems 200, 270, 300 with some or all of the sensor data described above may determine that the user is biking south (e.g., based on movement, speed, and gait) along a two-lane road in a remote area (e.g., based on GPS location and ambient noise) in sunny conditions at 2:10 PM (e.g., based on time and weather data), with at least one vehicle approaching from the rear (e.g., based on ambient noise). In some embodiments, the lighting profile may be further based on user selection data corresponding to a selected mode of operation of the audio devices. For example, a user may indicate that she will be biking or cycling for a period of time via a user interface on the host computing device or audio device.

System 200 may dynamically adjust the lighting profile for the audio devices based on this information. For example, the lighting profile may direct a flashing, high intensity lighting pattern behind user 505, towards the direction of the approaching vehicle. Because user 505 is biking south, system 200 may determine that user 505 is one a right side of the road, south bound, and that the vehicle will pass on user 505's left side. This may be further confirmed with GPS data. As such, system 200 may employ adapt the lighting profile for better power efficiency by only applying the lighting profile to the left audio device (rather than both by default) as that audio device may be more likely to be seen by the driver of the approaching car. Other power efficient adaptations can include applying light profiles during certain times of the day (e.g., after sunset and before sunrise), applying lighting profiles when others are detected (e.g., other users, vehicles, etc.) via audio data from microphones, or the like. In some cases, the lighting profile may be dynamically modified based on a determined amount of time that the lighting profile is expected to be used and the remaining amount of power in the batteries. For example, if a user is expected to be running in a dim environment for a certain period of time (e.g., based on a calendar entry, based on a present speed and expected route, based on a user input, etc.), certain features can be dynamically modified to conserve power. For instance, light intensity for the light emitters can be reduced, power intensive lighting patterns may be modified or replaced with others having lower power requirements, some on-board features may be modified or turned off (e.g., audio volume reduced, noise cancellation or other functions using on-board microphones turned off, GPS or IMU functions reduced or turned off, etc.). One of ordinary skill in the art with the benefit of this disclosure would appreciate the many modifications, variations, and alternative embodiments thereof.

In certain embodiments, any of the system blocks of system 200, 270, or 300 can be used to control aspects of the lighting elements on the audio device. Many of the embodiments described herein describe a lighting profile that controls one or more light emitters of an audio device. In some cases, individual blocks of systems 200, 270, 300 may directly control aspects of the audio device rather than contributing sensor data to generate the lighting profile. For example, a power management block of the audio device may independently cause the audio device to change performance characteristics (e.g., audio volume, light intensity) to extend a battery life. In another example, the processor(s) of the audio device may have a special mode of operation that prioritizes safety over performance and may cause the audio device to change performance characteristics to that end (e.g., power saving operational modifications to conserve power for the light emitters during low ambient illumination settings, such as after sunset hours, etc.). In the examples that prioritize safety, the system may detect that a battery level has reached a determinable threshold. In response to such detection, the system may disable some features of the audio device while maintaining operation of the lighting profile. Examples of features that may be disabled include audio input/output, physiological monitoring, activity tracking, location tracking, wireless connection with a host device, and the like. The features disabled may be user configurable or they can be hard coded. It should be appreciated that it's consistent with embodiments contemplated by this disclosure that there may be multiple determinable thresholds, each associated with different prioritization schemes for different battery levels. Thus, at one threshold (or one battery level), the system may turn off activity tracking. Then at another threshold (or battery level, lower than the prior battery level), the system may turn off audio input and output. In this and other embodiments, where a power management block controls features in this way, specific features are turned off while maintaining at least some operation of the lights. This provides some priority to the safety of the individual wearing the audio device over these other features. In other words, the lighting profile may control the light emitters, other system elements (e.g., power management block) may control the light emitters, or a combination thereof can control the light emitters.

Synchronizing Audio Devices Between Users

Some of the embodiments described heretofore involve the generation of a lighting profile for an audio device based on a characterization profile derived from user environment data and, in some cases, user selection data. In some embodiments, one or more additional audio devices may be synchronized such that their corresponding light emitters operate according to a same lighting profile, or lighting profiles that operate cooperatively with one another.

Figure 5B:
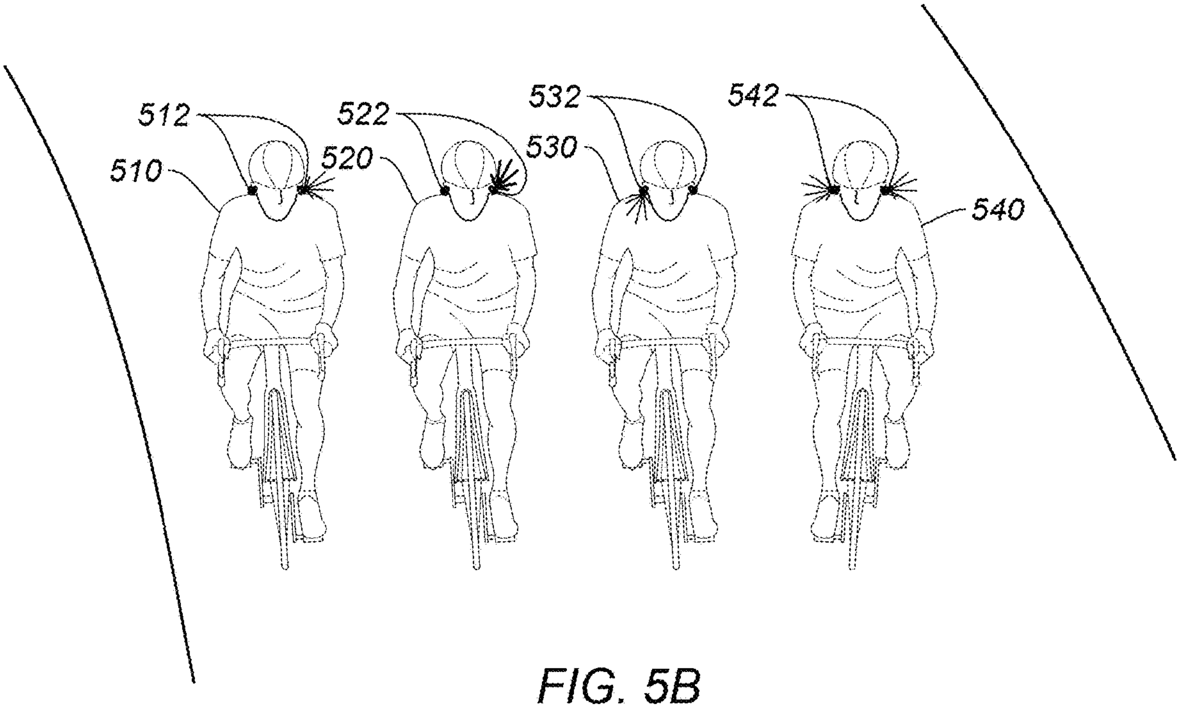
FIG. 5B shows a group of cyclists with corresponding audio devices riding along a road, according to certain embodiments.

FIG. 5B shows a group of cyclists 510-540 with corresponding audio devices riding along a road, according to certain embodiments. Each audio device operates based on a lighting profile based on a characterization profile for the corresponding user that may be derived from the user environment data and/or user selection data. Each audio device may be operating independently from other audio devices such that there may not appear to be a synchronized lighting pattern between devices. For example, user 510 is using audio device 512, which is operates accordingly to a first lighting profile where the left side ear bud emits a forward and backward facing lighting pattern while the right ear bud remains turned off for improved power efficiency. The audio device 522 of user 520 uses a similar lighting profile, but with increased light intensity in response to a combination of ambient sounds and user selection data. Audio device 532 of user 530 employs a lighting profile that emits light on the opposite side and in the forward direction, as compared to user 510. Audio device 542 of user 540 is configured to operate according to a lighting profile with light emitters enabled on both audio earbuds. Thus, each audio device may operate independently from one another with different lighting profiles having different blinking patterns, durations, power settings, or the like, which may appear to an outside observer as non-uniform in operation. In some dim environmental settings, the lights may help onlookers see the cyclists better, but the non-uniform operation may make it difficult to discern the number of users or how they may be positioned in relation to one another, as some audio devices may not be utilizing their lighting elements, or they may be flashing at different rates and durations, making it hard to determine how big the group is.

Figure 5C:
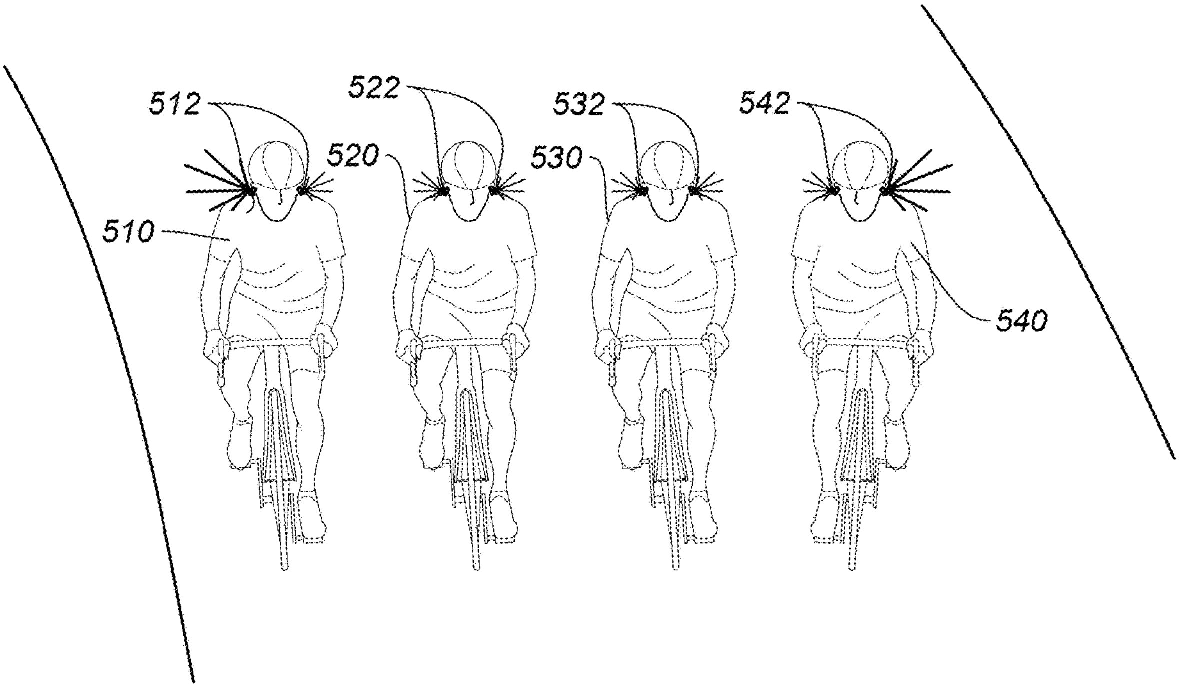
FIG. 5C shows the group of cyclists with synchronized audio devices, according to certain embodiments.

FIG. 5C shows the group of cyclists 510-540 with synchronized audio devices, according to certain embodiments. In some cases, two or more audio devices may be configured to operate in synchronization with one another. For example, a host computing device may broadcast a lighting profile that identically conforms the same lighting output schema for lighting elements of each audio device within a threshold area, common pico-net, or the like. In some aspects, a common lighting profile may be received by multiple audio devices, but each audio device may activate its lighting element differently based on the audio devices relationship to the other audio devices, which can include a spatial relationship (e.g., how close other audio devices are, how the audio devices are positioned relative to one another, etc.), a hierarchical relationship (e.g., some audio devices or host computing devices may be configured as a "leader" device, while others may have a secondary, tertiary, etc., ranking), or other suitable metric. In the example shown in FIG. 5C, the audio devices 512-542 of the group of cyclists are synchronized such that a same lighting pattern is operating on each audio device. Furthermore, the outermost audio devices have their corresponding lighting elements on the outermost side of the group of cyclists have a substantially higher intensity. Thus, each audio device may operate in synchronization with one another, which may be more easily seen by outside observers and, in some dim environments, the brighter outermost lighting elements may operate to more clearly illuminate the size of the group (e.g., highlighting the outermost cyclists).

In certain embodiments, one host computing device and/or multiple host computing devices may provide the lighting profile for the group of audio devices. In some aspects, a control audio device may control a number of agent audio devices (e.g., a left audio earbud may control the right audio earbud, as well as other user's earbuds). In some embodiments, one device (e.g., host computing device, audio device) may send a lighting profile to all audio devices within a group in a hub-and-spoke type relationship. In some aspects, a lighting profile may be sent from audio device to audio device in series fashion. One of ordinary skill in the art with the benefit of this disclosure would appreciate the many modifications, variations, and alternative embodiments thereof.

Examples of Various Implementations that Use Lighting Profiles on Audio Devices

In certain embodiments, a cyclist's audio device may be configured to operate one or more lighting elements to shine in a forward direction and in outward directions (in wide projection angles) with constant beams (e.g., non-blinking) so they cyclist can better see the road ahead and around her. One or more sensors on the host computing device and/or audio device may detect a car approaching from the rear (e.g., via microphone(s) sensor data, sensor data from an image sensor on a head-mounted display, etc.), which may temporarily change the characterization profile of the surrounding environment (e.g., based on the new sensor data) and cause a dynamic change of the lighting profile to address the present scenario. In some cases, the lighting profile may be changed such that the audio device directs light from lighting elements on one or both earbuds in a rear-direction with a high intensity flashing pattern to alert the approaching driver of the cyclists presence. In some aspects, light emitters that are directed forward may be configured to operate in a first color (e.g., white) and light emitters directed backwards may be configured to operate in a second color (e.g., red), similar to a vehicle, so that an oncoming vehicle can quickly tell whether the user is heading toward or away from them. Similarly, a different left/right side color scheme may be used. After the suite of sensors (e.g., of system 200, 270, 300) determines that no vehicles are around, the lighting profile may return back to the original setting with forward/sideways oriented lights, or may adopt a new lighting profile (e.g., a more power efficient profile), as would be appreciated by one of ordinary skill in the art with the benefit of this disclosure.

In some embodiments, host computing device (e.g., smart phone 110) may run software (e.g., processor(s) 302 executing software stored on storage subsystem 306) that polls the IMU to determine how the user is moving. In the example of FIG. 4A, the IMU (e.g., an accelerometer) may provide data that is indicative of the user moving at a relatively constant rate (e.g., small changes in acceleration) and with a highly cyclical gait that corresponds to a consistent up and down motion that a bike rider may have while pedaling. In some aspects, the IMU (e.g., an gyroscope) may provide data corresponding to a user's orientation. In the case where the host computing device is a head-mounted display, the host computing device may determine which way the user is looking by the direction that the user's head is facing. In some cases, the user's facial orientation may be determined indirectly by certain detected motions of the user's body (e.g., a smart phone is the user's pocket detects when the user's torso turns by a certain threshold angle (e.g., 40 degrees)), which may be indicative of the user turning their head. In some aspects, data from multiple sources can be combined to better determine both the user's environment and their mode of travel. For instance, a GPS may show a user traveling at 30 mph along a road, which may possible in a car or on a bicycle (e.g., traveling downhill). The IMU may provide greater confidence that the user is biking instead of driving in a vehicle based on the cyclic gait while the user is pedaling. The system (e.g., system 200, 270, 300) can then apply an appropriate lighting profile based on the analysis above corresponding to the characterization profile of and within the surrounding environment. It should be noted that the characterization profile may relate to the environment itself (e.g., city, secluded road, etc.), activity occurring in the vicinity (e.g., vehicle traffic, people walking by, quiet setting, etc.), and/or user activity (e.g., stationary, sitting, biking, running, driving, jumping, playing sports, etc.). In some aspects, a manual user selection on a UI may indicate the user activity. After the system determines that the user is biking, for example, a suitable lighting profile may be applied to the lighting elements on the audio device. For instance, the lighting profile for a lone cyclist may synchronize left and right side lighting elements on the audio device or may control each set of lighting elements differently. For example, one set of lighting elements (e.g., on the left side) may blink at a different rate, with a different pattern, color, direction of illumination, or intensity than on a second set of lighting elements (e.g., on the right side). In some cases, the lighting profile may be dynamically modified to accommodate a temporary change (e.g., new condition) in the characterization profile. For example, the lighting profile may cause one or more lighting elements to change a blinking pattern or direct light towards approaching vehicles so the user is more visible, and then change back to the previous lighting profile after the new condition is no longer present.

In some embodiments, host computing device (e.g., smart phone 110) may run software that polls the one or more microphones on the host computing device to listen to ambient audio around the user to help determine aspects of the user's environment. For example, sounds such as high levels of road noise, engine noise, and/or wind noise may indicate that the user is traveling in a vehicle. The amount of road/engine/wind noise may also provide clues as to how fast the user is going, the type of vehicle being used (e.g., motorcycles and bicycles may have higher ambient road/engine/wind noise than a car with its windows up). Footsteps, wind noise, machinery, white noise, etc., can be detected via one or more microphones on the host computing device, which can add to the user environment data. The detection of human voices and the fidelity of the signal may help indicate whether a user is indoors or outdoors, in a crowd or a small group of people, in a city center or a remote area, or the like. As described above, the audio data can be used in conjunction with other sensing resources to increase a confidence level that a user is in a particular environment, which can be provided to the audio device as a characterization profile, as described above. In some embodiments, a Voice Activity Detector (VAD) can be used by the host computing device, the audio device, or a combination thereof to detect when a human voice is detected and whether the voice is directed to the user or not.

VAD data can be used in conjunction with other sensor data, as described above, to get a more accurate characterization profile of the surrounding area, as well as activity within the surrounding area. For example, consider a group of joggers running along a road. GPS data can be used to determine a user location and trajectory. IMU data can be used to determine a user's speed and gait, and microphone data (e.g., on the host computing device and/or audio device) may detect road noise (e.g., vehicles), footsteps, voice(s), etc., which may further increase a confidence level that a user is performing a particular task (e.g., jogging).

In some embodiments, two or more audio devices may be synchronized (e.g., via communication block 240 or network interface 312) and/or in communication with each other to simultaneously perform similar or related lighting profiles. For example, a group of runners may have audio devices that share a same lighting profile so that the group appears to have synchronized lighting elements. In some embodiments, certain users in a group may have certain designation, such as a leader, which may be based on user input data on a UI (e.g., the user manually designates herself as leader), based on sensor data (e.g., GPS data indicates the user is ahead of a pack of runners, etc.), or the like. In such cases, some designations may have lighting profiles that may differ from the group that are sharing a lighting profile. For example, a leader may have a different lighting pattern, intensity, color, or other lighting characteristics than other users in the group. In some cases, users around the exterior of a group may have different lighting profile (e.g., higher intensity light emitter output, more active blinking patterns, etc.) than users in the interior of the group (e.g., lower intensity light emitter output) that may operate to highlight the size of the group in low light settings and may help conserve power for users within the group that may have obscured light emitter output paths due to others in the group. In some cases, the lighting profiles may dynamically change based on certain designation, such as when a new user moves to or from the head of the pack or to an outside position, or a new environmental condition (e.g., a car approaching, changing weather (e.g., sunny to rainy)), ambient lighting conditions, or the like. Some lighting profiles may implement gaming-like aspects, such as using the lighting element to indicate a user's position in a race. For example, the lighting elements may be activated according to a binary number system (e.g., four lighting elements may indicate binary 0-15), each user may have lighting elements that change a color and/or pattern based on their position, or a leader may alter their lighting profile to be directed backwards to the group and at a blinking rate that matches the leader's gate.

In certain embodiments, a shared lighting profile may incorporate power saving features based on group dynamics. For instance, outer most users in a group may have lighting profiles with higher output settings (e.g., higher intensity, faster blinking frequency, etc.), while interior positioned users may have lower output settings (e.g., lower intensity). In some cases, the system (e.g., any of systems 200, 270, 300) may indicate to a user that they should move to a position that has a lighting profile with less power consumption in order to extend battery operating life, which may be based on the user's system or from another user's corresponding system in the group to collectively and dynamically manage power consumption for some or all audio devices in the group. In the various embodiments described throughout the present disclosure, a lighting profile may correspond to a single set or multiple sets of lighting element output characteristics. For example, when a user's lighting profile causes the lighting elements to dynamically change according to a changing characterization profile, a new lighting profile may control the lighting elements, or a same lighting profile may control the lighting elements. A single lighting profile may include multiple sets of lighting element output characteristics that are selected and applied based on certain criteria, such as when the weather changes, ambient lighting changes, others (e.g., users, vehicles) come in proximity to the user, power resources, or the like. One of ordinary skill in the art with the benefit of this disclosure would appreciate the many modifications, variations, and alternative embodiments thereof.

In further embodiments, a host computing device (e.g., smart phone 110) may run software that accesses a network interface (312) to detect Wi-Fi access points. In some cases, environmental information can be gleaned from the name of the Wi-Fi access point. For instance, an access point that shares the name of a commercial establishment can provide some indication of the user's setting (e.g., a café, an office, a residence, etc.), which can be used to determine an appropriate lighting profile. Other types of sensor data can be used to gather user environment data and is not limited to the examples given here. For instance, user biometric data (e.g., via a smart watch) may provide heartbeat data, breathing data, etc., which can be used to determine what the user is doing, their condition, etc., which can inform how to characterize the user's environment in a characterization profile and how to apply an appropriate lighting profile.

In certain cases, once the user environment data (e.g., audio data, GPS data, IMU data, Wi-Fi access point data, etc.) is collected and analyzed, the characterization profile of the user's surrounding environment can be determined based on the user environment data. The characterization profile may include cross-referencing the various types of user environment data separately and collectively against a look-up table or template to determine a particular characterization profile to report to the audio device. In some aspects, the host computing device may use artificial intelligence and machine learning to identify behaviors and activities that the user typically partakes in, audio device preferences that the user may like in certain circumstances, locations, etc., and the like, to determine how to formulate the characterization profile accordingly. Once the characterization profile is sent from the host computing device to the audio device, the audio device may then dynamically adapt the lighting profile of its plurality of lighting elements based on the received characterization profile of the user's surrounding environment. Any suitable lighting profile may be applied, including the many examples presented herein, as well as other types which may include more directions, different power efficiency schemas, etc., as would be appreciated by one of ordinary skill in the art with the benefit of this disclosure. It should be noted that although the embodiments shown and described herein generally refer to a process where the host computing device performs the acquisition of sensor data and determination of a suitable characterization profile, it would be understood by those of ordinary skill in the art with the benefit of this disclosure that some devices (e.g., an HMD, smart glasses, etc., that have audio devices built in) may have all of the necessary sensory capabilities and processing bandwidth to perform all of the various operational steps to analyze a user's environment and adapt a lighting profile of a plurality of lighting elements on the audio device.

The characterization profile can be realized in a number of different ways. For instance, a characterization profile can be a table that describes the scenario/factors and may include a decision. For example, a GPS may show that a user is indoors, a microphone with artificial intelligence (AI) may determine that there is a lot of people talking in the background (e.g., in a café or office), and IMU (e.g., accelerometer) may indicated some head/body movement, and a VAD may indicate that there is "dominant speech" in front of the person, so the table may indicate that a lighting profile should be selected that does not shine light directly into the person's face. In some cases, where the VAD does not pick up any activity, the user may be focused on their work and the characterization profile may reflect that a forward and downward directed lighting profile (e.g., to improve desk/table lighting) would be an appropriate setting. In some aspects, a GPS may indicate that the user is outdoors, and the characterization profile may indicate that a relatively active lighting profile is preferred (e.g., high intensity) when an IMU detects motion (e.g., cycling, running, etc.), or that a non-active lighting profile is preferred when the IMU detects that the user is stationary (e.g., sitting at a park bench).

In some aspects, a direct location assessment can be performed. For instance, based on GPS and map data, the system can deduce the type of building that the user is in, which can inform the appropriate lighting profile of the audio device. In some aspects, direct AI environmental detection can be used. For instance, a host computing device microphone can be used to determine the user's environment, as described above. Based on AI voice model training and audio captured by the microphone, the system can determine that the user is in a gym, in traffic, or other trained sounds that can help the system determined an appropriate lighting profile for the audio device. Alternatively or additionally, a user may select an operating mode, which can be used in addition to the characterization data to inform an appropriate lighting profile.

The various embodiments described above are not intended to be provided as an exhaustive list of applications, but rather as some examples that can be used, modified, or referenced to inspire other uses not necessarily expressly presented herein. For instance, some functionality not directly related to some of the embodiments above may related to corresponding devices including audio device cases (e.g., causes activation/deactivation of the audio devices and/or some of its functionality when the audio device is placed in or removed from the case), or communication with other devices to relay corresponding messages (e.g., cause an HMD to display a graphic alerting the user to an approaching vehicle, low power levels, a selected mode of operation, etc.). In some embodiments, an orientation of the audio device in a user's ear can be determined (e.g., based on the direction of gravity detected by an accelerometer of the IMU), which may inform whether any of the lighting elements might be occluded by certain features of the user's ear based or how the audio device is positioned in the user's ear. When possible occlusion is determined, some of the occluded lighting element may be turned off (e.g., to improve power consumption) or an alert may be provided (e.g., via speakers on the audio device or other audio/visual resource on the audio device or host computing device).

Figure 6:
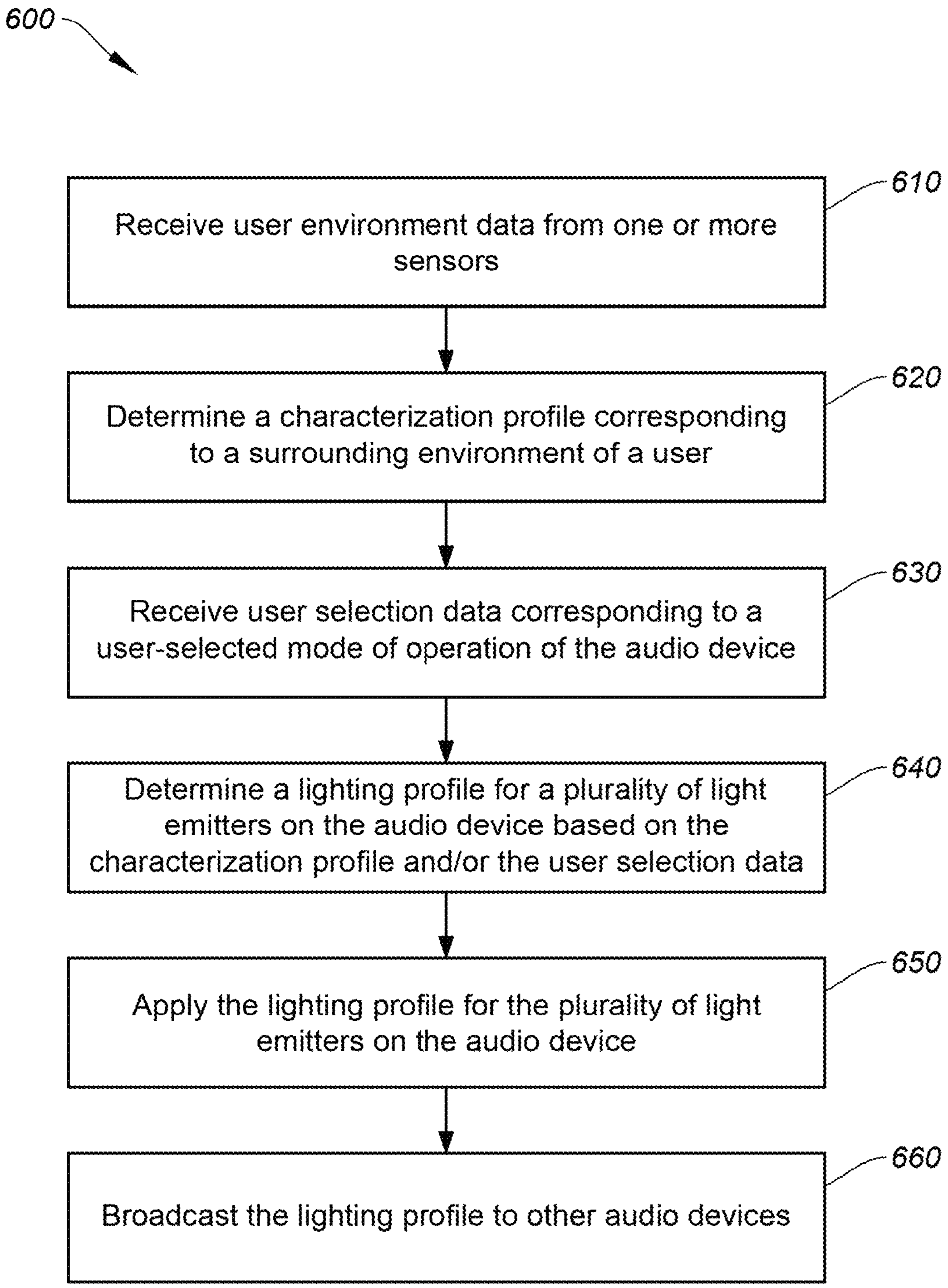
FIG. 6 is a simplified flow chart showing aspects of a method for operating a host computing device to adjust performance characteristics (e.g., a lighting profile) on an audio device, according to certain embodiments.

FIG. 6 is a simplified flow chart showing aspects of a method 600 for operating a host computing device to adjust performance characteristics (e.g., a lighting profile) on an audio device, according to certain embodiments. Method 600 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 600 can be performed by aspects of processor 302 and system 300, processor 210 and system 200 (e.g., when the host computing device and audio device are combined into one system, such as with smart glasses), processor 272 and system 270, or a combination thereof.

At operation 610, method 600 can include receiving, by one or more processors on the host computing device, user environment data, according to certain embodiments. The user environment data may include data collected by one or more sensors on the host computing device, including GPS data corresponding to a location of the user, audio data corresponding ambient sounds around the user, acceleration data (e.g., via IMU) corresponding to a motion of the user, orientation data corresponding to an orientation of the user, or internet access point data, which may correspond to a location of the user, orientation data (e.g., via magnetometer and/or gyroscope), or other suitable sensor data.

At operation 620, method 600 can include determining a characterization profile of a surrounding environment of the user based on the user environment data, according to certain embodiments. Operation 620 may be performed by the host computing device or the audio device.

At operation 630, method 600 can include receiving user selection data corresponding to a user-selected mode of operation of the audio device. The user selection data may be received via a manually controlled user interface or from an automated system (e.g., a scheduled activity received from a calendar application, from another host computing device). The mode of operation may correspond to a user activity, such as running, cycling, walking, or the like. One of ordinary skill in the art with the benefit of this disclosure would appreciate the many modifications, variations, and alternative embodiments thereof. Operation 630 may be performed by the host computing device or the audio device.

At operation 640, method 600 can include determining a lighting profile for a plurality of light emitters on the audio device based on the characterization profile (and in some cases the user environment data) and/or the user selection data, the lighting profile configured to cause the audio device to adapt lighting characteristic(s) (e.g., lighting pattern, color, blinking frequency, intensity, etc.) on a plurality of lighting elements on the audio device, according to certain embodiments. In some aspects, the audio device can be configured to be worn by the user such that a speaker of the audio device projects audio into the user's ear. It should be noted that many of the embodiments herein discuss using environmental data (e.g., audio) detected by the host computing device, although some embodiments may also capture environment data from the audio device (e.g., audio capture by the plurality of microphones). In some cases, the host computer device may "command" the audio device to configure their plurality of light emitting elements in a particular pattern, or the audio device may determine a lighting profile based on the characterization profile, or the like. One of ordinary skill in the art with the benefit of this disclosure would appreciate the many modifications, variations, and alternative embodiments thereof. Operation 640 may be performed by the host computing device or the audio device.

At operation 650, method 600 can include applying (e.g., by the audio device) the lighting profile for the plurality of light emitters on the audio device, according to certain embodiments.

At operation 660, method 600 can include broadcasting the lighting profile causing the audio device and other audio devices with light emitters within a threshold distance to synchronize according to the lighting profile. In some aspects, method 600 may further include determining a power consumption profile based on the characterization profile or the user selection data, and modifying a power consumption of the audio device based on the power consumption profile. In some aspects, the power consumption profile can be further based on a determined user activity, a location of the audio device, a time of use of the audio device, an intended length of use of the audio device, or any other consideration as described throughout the present disclosure.

It should be appreciated that the specific steps illustrated in FIG. 6 provide a particular method 600 for operating a host computing device to generate/adapt a lighting profile for an audio device, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 7:
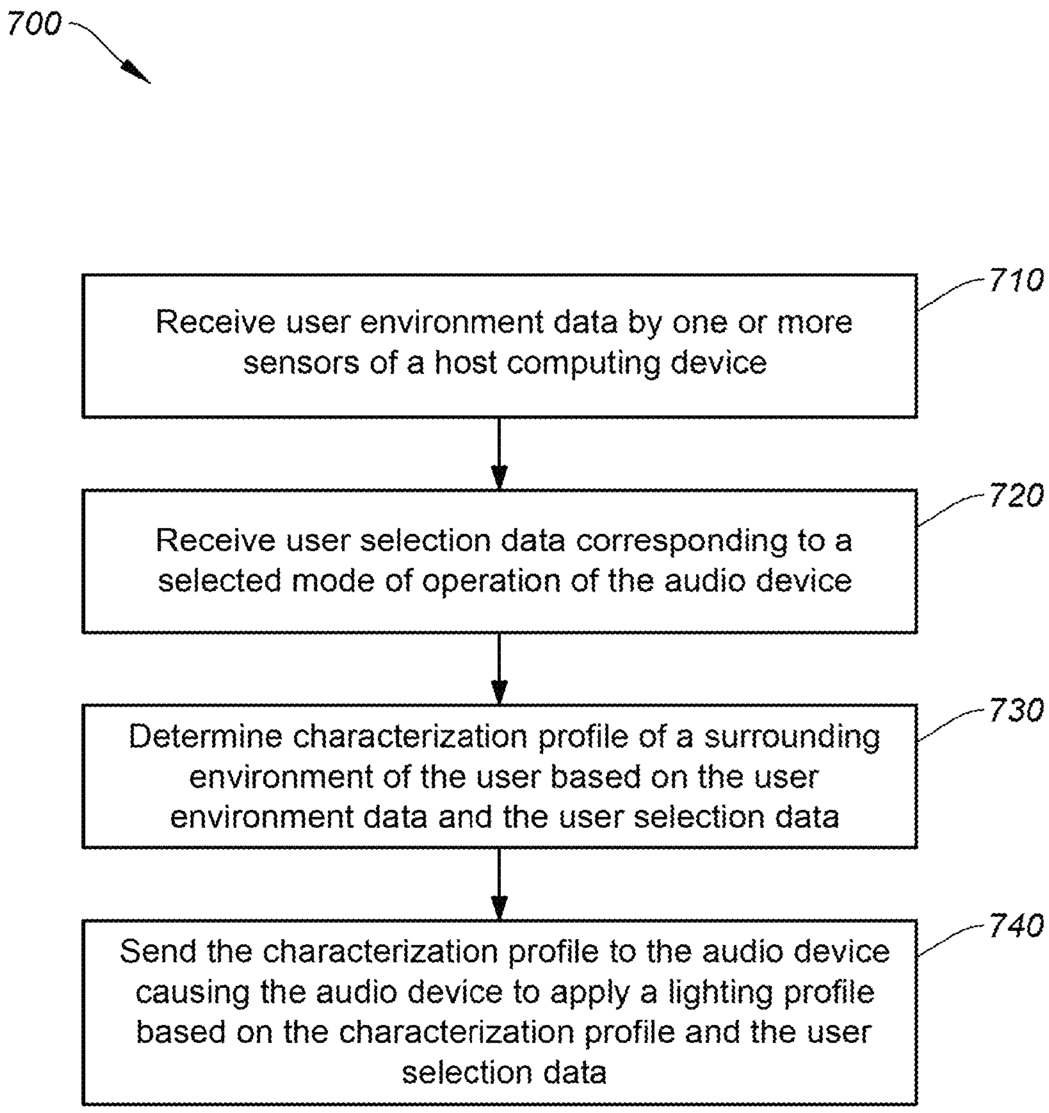
FIG. 7 is a simplified flow chart showing a method for operating an audio device, according to certain embodiments.

FIG. 7 is a simplified flow chart showing a method 700 for operating an audio device, according to certain embodiments. Method 700 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 700 can be performed by aspects of processor 210 and system 200, processor 302 of system 300 (e.g., when the host computing device and audio device are combined into one system, such as with smart glasses), or a combination thereof.

At operation 710, method 700 can include receiving, by one or more processors on the audio device, a characterization profile corresponding to a surrounding environment of a user, the characterization profile received from a host computing device wirelessly and communicatively coupled to the audio device, according to certain embodiments. The characterization profile can be based on user environment data collected by the host computing device. In some aspects, the audio device can be configured to be worn by a user such that a speaker of the audio device projects audio into the user's ear. The user environment data may include data collected by one or more sensors on the host computing device, including GPS data corresponding to a location of the user, audio data corresponding ambient sounds around the user, acceleration data (e.g., via IMU) corresponding to a motion of the user, orientation data corresponding to an orientation of the user, or internet access point data, which may correspond to a location of the user, orientation data (e.g., via magnetometer and/or gyroscope), or other suitable sensor data.

At operation 720, method 700 can include receiving user selection data corresponding to a selected mode of operation of the input device. The user selection data may be received via a manually controlled user interface (e.g., user-selected) or from an automated system. The mode of operation may correspond to a user activity, such as running, cycling, walking, or the like. One of ordinary skill in the art with the benefit of this disclosure would appreciate the many modifications, variations, and alternative embodiments thereof.

At operation 730, method 700 can include determining, by the one or more processors, a lighting profile for a plurality of light emitters based on the characterization profile and the user selection data. In further embodiments, method 700 may include causing the communication module to facilitate a broadcasting of the lighting profile that causes the audio device and other audio devices with light emitters within a threshold distance of the host computing device or the audio device to synchronize according to the lighting profile. The lighting profile may cause the plurality of light emitters to change a light intensity, a blink rate, a blink duration, a color, a blink pattern per light emitter, a blink sequence across the plurality of light emitters, or the like, as would be appreciated by one of ordinary skill in the art with the benefit of this disclosure. In some embodiments, method 700 can include determining a power consumption profile based on the characterization profile or the user selection data and modifying a power consumption of the audio device based on the power consumption profile. The power consumption profile may be further based on the determined user activity, a location of the audio device, a time of use of the audio device, an intended length of use of the audio device, or the like, as would be appreciated by one of ordinary skill in the art with the benefit of this disclosure.

It should be appreciated that the specific steps illustrated in FIG. 7 provide a particular method 700 for operating an audio device, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

In some embodiments, machine learning (ML) can be used to train the detection of specific sounds or sound types, which may inform the generation of the characterization profile. For example, some types of sounds that can be detected and identified via training may include car engine noise, road noise, car horns, and the like. Training can be achieved by feeding samples (e.g., often hundreds or thousands of samples) of car engine noise, road noise, and car horn sounds into the ML model and classifying these sounds (e.g., as "traffic"). The trained model can then be used to determine whether there is traffic or not, which can inform how to classify the user's environment. One of ordinary skill in the art with the benefit of this disclosure would appreciate the many modifications, variations, and alternative embodiments thereof.

As noted above, many examples described in the present disclosure are directed to the host computing device collecting and processing environment data and generating a characterization profile based on the environment data. The characterization profile is typically sent to the audio device, which it uses to determine a lighting profile for a plurality of lighting elements on the audio device. In some cases, the environmental data may be sent to the audio device and proceed there (e.g., smart glasses). Typically, the earbuds use the characterization profile to determine a suitable lighting profile, although in some embodiments, the host computing device may determine the lighting profile pattern. One of ordinary skill in the art with the benefit of this disclosure would appreciate the many modifications, variations, and alternative embodiments thereof.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as “processing,” “computing,” “calculating,” “determining,” and “identifying” or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, “can,” “could,” “might,” “may,” “e.g.,” and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list. The use of “adapted to” or “configured to” herein is meant as open and inclusive language that does not foreclose devices adapted to or configured to perform additional tasks or steps. Additionally, the use of “based on” is meant to be open and inclusive, in that a process, step, calculation, or other action “based on” one or more recited conditions or values may, in practice, be based on additional conditions or values beyond those recited. Similarly, the use of “based at least in part on” is meant to be open and inclusive, in that a process, step, calculation, or other action “based at least in part on” one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method of operating an audio device comprising:

receiving, by one or more processors on the audio device, a characterization profile corresponding to a surrounding environment of a user, the characterization profile received from a host computing device wirelessly and communicatively coupled to the audio device;

receiving, by the one or more processors, user selection data corresponding to a user-selected mode of operation of the audio device, wherein the audio device is configured to be worn by a user such that a speaker of the audio device projects audio into the user’s ear;

determining, by the one or more processors, a lighting profile for a plurality of light emitters on the audio device based on the characterization profile and the user selection data;

applying the lighting profile to the plurality of light emitters on the audio device; and sending a synchronization signal that synchronizes the lighting profile with other local audio devices within a threshold area or common piconet, causing the other local audio devices to apply the lighting profile simultaneously and in synchronization with the audio device, wherein the audio device is one of a wireless audio headset or a set of wireless audio earbuds.

2. The method of claim 1 wherein the characterization profile is based on at least one of:

GPS data corresponding to a location and/or a direction of travel of the user;

acceleration data corresponding to a motion of the user; or orientation data corresponding to an orientation of the user.

3. The method of claim 1 wherein the one or more processors are further configured to:

cause a communication module to facilitate a broadcasting of the lighting profile that causes the audio device and other audio devices with light emitters within a threshold distance of the host computing device or the audio device to synchronize according to the lighting profile.

4. The method of claim 1 wherein the lighting profile causes the plurality of light emitters to change at least one of:

a light intensity;

a blink rate;

a blink duration;

a color;

a blink pattern per light emitter; or a blink sequence across the plurality of light emitters.

5. The method of claim 1 wherein the one or more processors are further configured to:

determine a power consumption profile based on the characterization profile or the user selection data; and modify a power consumption of the audio device based on the power consumption profile.

6. The method of claim 5 wherein the power consumption profile is further based on at least one of:

a determined user activity;

a location of the audio device;

a time of use of the audio device; or an intended length of use of the audio device.

7. The method of claim 1 wherein synchronization signal causes light emitters on the other audio devices to apply a different lighting profile based on:

a spatial relationship of the audio device with respect to the other local audio devices; or a hierarchical relationship of the audio device with respect to the other local audio devices.

8. A method of operating an audio device comprising:

receiving, by one or more processors on the audio device, a characterization profile corresponding to a surrounding environment of a user, the characterization profile received from a host computing device wirelessly and communicatively coupled to the audio device;

receiving, by the one or more processors, user selection data corresponding to a user-selected mode of operation of the audio device, wherein the audio device is configured to be worn by a user such that a speaker of the audio device projects audio into the user's ear;

determining, by the one or more processors, a lighting profile for a plurality of light emitters on the audio device based on the characterization profile and the user selection data;

applying the lighting profile to the plurality of light emitters on the audio device; and sending a synchronization signal that synchronizes the lighting profile with other local audio devices within a threshold area or common piconet, causing the other local audio devices to apply the lighting profile simultaneously and in synchronization with the audio device wherein the audio device is one of a wireless audio headset or a set of wireless audio earbuds.

9. The method of claim 8 wherein the characterization profile is based on at least one of:

GPS data corresponding to a location and/or a direction of travel of the user;

acceleration data corresponding to a motion of the user; or orientation data corresponding to an orientation of the user.

10. The method of claim 8 wherein the one or more processors are further configured to:

cause a communication module to facilitate a broadcasting of the lighting profile that causes the audio device and other audio devices with light emitters within a threshold distance of the host computing device or the audio device to synchronize according to the lighting profile.

11. The method of claim 8 wherein the lighting profile causes the plurality of light emitters to change at least one of:

a light intensity;

a blink rate;

a blink duration;

a color;

a blink pattern per light emitter; or a blink sequence across the plurality of light emitters.

12. The method of claim 8 wherein the one or more processors are further configured to:

determine a power consumption profile based on the characterization profile or the user selection data; and modify a power consumption of the audio device based on the power consumption profile.

13. The method of claim 12 wherein the power consumption profile is further based on at least one of:

a determined user activity;

a location of the audio device;

a time of use of the audio device; or an intended length of use of the audio device.

14. The method of claim 8 wherein synchronization signal causes light emitters on the other audio devices to apply a different lighting profile based on:

a spatial relationship of the audio device with respect to the other local audio devices; or a hierarchical relationship of the audio device with respect to the other local audio devices.

* * * * *